(12) United States Patent
Kamimura et al.

(10) Patent No.: US 7,306,313 B2
(45) Date of Patent: *Dec. 11, 2007

(54) METHOD OF CORRECTING ADJUSTMENT VALUE FOR IMAGE FORMING APPARATUS, IMAGE FORMING APPARATUS, AND MEMORY MEDIUM

(75) Inventors: Eiji Kamimura, Tenri (JP); Yoshikazu Harada, Nara (JP); Kyosuke Taka, Nara (JP); Nobuo Manabe, Yamatokooriyama (JP); Toshio Yamanaka, Yao (JP); Norio Tomita, Yamatokooriyama (JP); Manabu Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 792 days.

This patent is subject to a terminal disclaimer.

(21) Appl. No.: 10/626,396

(22) Filed: Jul. 23, 2003

(65) Prior Publication Data

US 2004/0130737 A1 Jul. 8, 2004

(30) Foreign Application Priority Data

Jul. 29, 2002 (JP) .............................. 2002-220270

(51) Int. Cl.
*B41J 29/393* (2006.01)

(52) U.S. Cl. .................. 347/19; 347/133; 347/116

(58) Field of Classification Search .................. 347/19, 347/133, 116, 5, 9; 399/15, 49, 301; 358/1.9
See application file for complete search history.

(56) References Cited

U.S. PATENT DOCUMENTS

| 5,933,680 A | * | 8/1999 | Nishimura | .................... 399/49 |
| 6,148,168 A | | 11/2000 | Hirai et al. | .................. 399/301 |
| 6,435,643 B1 | * | 8/2002 | Miura et al. | .................. 347/19 |

FOREIGN PATENT DOCUMENTS

| JP | 10-213940 | 8/1998 |
| JP | 2000-081744 | 3/2000 |

* cited by examiner

*Primary Examiner*—Lam Son Nguyen
(74) *Attorney, Agent, or Firm*—David G. Conlin; David A. Tucker; Edwards Angell Palmer & Dodge LLP

(57) ABSTRACT

A plurality of first base images are formed from a base color output in accordance with a predetermined adjustment value. A plurality of first correction images are formed on the first base images from a correction color to be a subject for correction output in accordance with a predetermined adjustment value. The first correction images are displaced within a predetermined range. The first adjustment value is determined from changed adjustment values. The second base images are formed from the base color output in accordance with the predetermined adjustment value, and the second correction images are formed from the correction color output in accordance with a plurality of adjustment values determined based on the first adjustment value. The second adjustment value having an extreme is determined from a plurality of adjustment value candidates. Finally, the adjustment value for the correction color is corrected to the determined second adjustment value.

20 Claims, 24 Drawing Sheets

FIG. 4

ADJUSTMENT VALUE TABLE

| TIMING OF EXPOSURE (msec.) | $T_0$ | $T_0+\Delta T_1$ | $T_0+\Delta T_2$ | $T_0+\Delta T_3$ | ·· $T_0+\Delta T_{11}$ ··· | $T_0+\Delta T_{98}$ | $T_0+\Delta T_{99}$ |
|---|---|---|---|---|---|---|---|
| EXPOSURE UNIT 1a (BLACK) | 0 | 1 | 2 | 3 | ········· | 98 | 99 |
| EXPOSURE UNIT 1b (CYAN) | 0 | 1 | 2 | 3 | ···· 11 ···· | 98 | 99 |
| EXPOSURE UNIT 1c (MAGENTA) | 0 | 1 | 2 | 3 | ········· | 98 | 99 |
| EXPOSURE UNIT 1d (YELLOW) | 0 | 1 | 2 | 3 | ········· | 98 | 99 |

ADJUSTMENT VALUE (dot)

52T

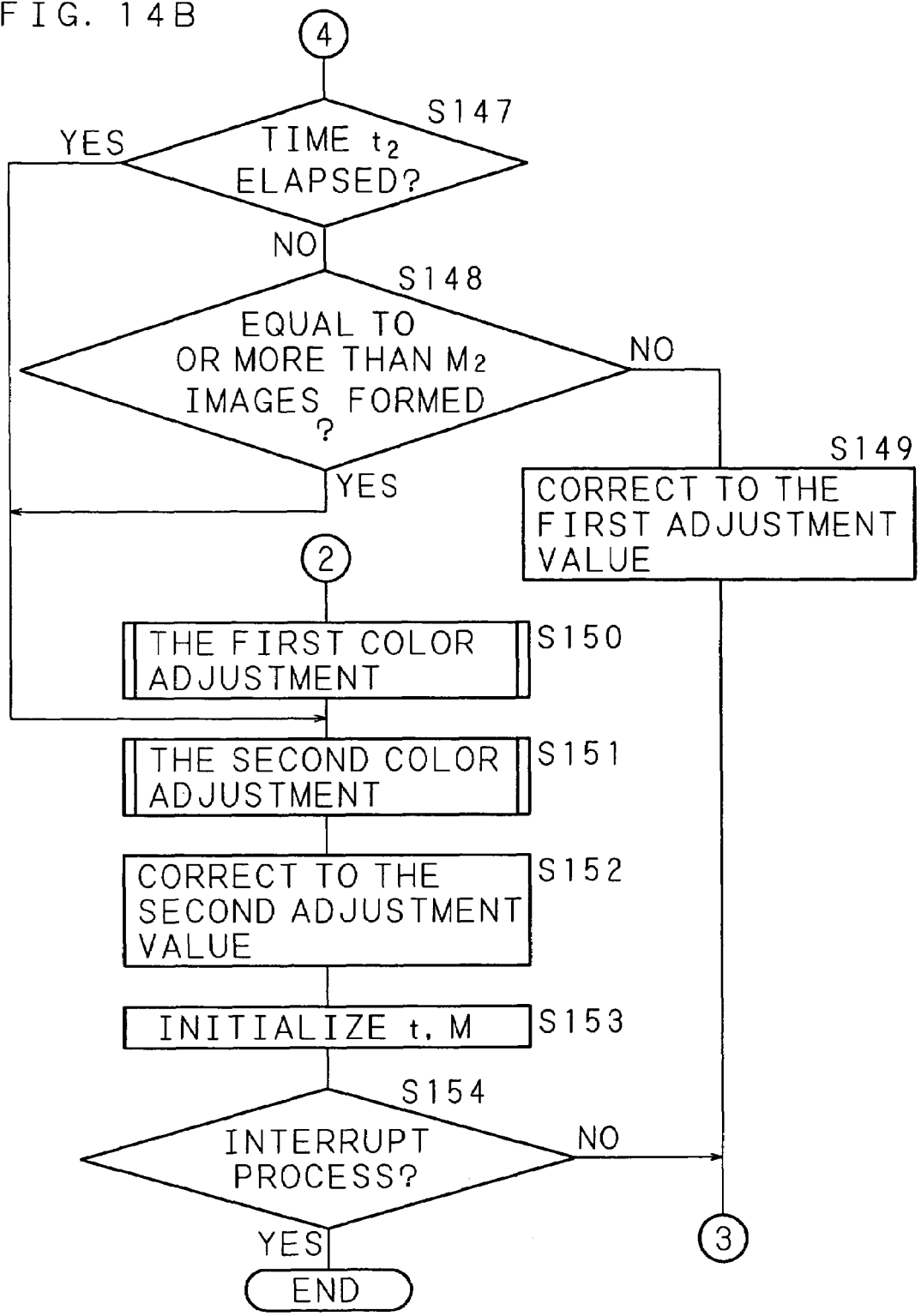

3-dot
DISPLACEMENT 4-dot
DISPLACEMENT 5-dot
DISPLACEMENT 4-dot
DISPLACEMENT 5-dot
DISPLACEMENT 6-dot
DISPLACEMENT

METHOD OF CORRECTING ADJUSTMENT VALUE FOR IMAGE FORMING APPARATUS, IMAGE FORMING APPARATUS, AND MEMORY MEDIUM

BACKGROUND OF THE INVENTION

1. Field of the Invention

The present invention relates to a method of correcting a predetermined adjustment value for an image forming apparatus that outputs an image of each of separated colors based on the adjustment value, an image forming apparatus using the method, and a recording medium for realizing the function of the image forming apparatus. In particular, the present invention relates to a method of correcting misregistered color images formed on a carrier.

2. Description of the Prior Art

An image forming apparatus such as a digital color copying machine or the like performs image processing on input data for each color component, and then forms a multi-color image by layering the images of the color components. If the images of the color components are misaligned in forming the multi-color image, color misregistration occurs in the resulting multi-color image, which may deteriorate the image quality. Particularly, in the image forming apparatus provided with an image forming portion for every color component in order to improve the speed of multi-color image formation, the images of the color components are formed at respective image forming portions and then layered one after another so as to form the multi-color image.

In such an image forming apparatus, misalignment often occurs in transfer positions of the images of the color components, causing a significant problem of color misregistration in the resulting multi-color image. In order to solve such a problem, a conventional image forming apparatus performs color adjustment corrects color misregistration in a multi-color image for achieving precise alignment of different color component images so as to form a good multi-color image without color misregistration. The color adjustment is usually performed by detecting a displacement of an image forming position of a color component from an image forming position of a base color component by an optical sensor. An amount of correction is then determined based on the detected result, and the timing for forming the image of each color component is adjusted in accordance with the amount of correction such that the transfer positions of the color component images match with one another.

To determine the amount of correction, first, a method of transferring the images of different color components at the same timing and then detecting the distance between the transfer positions of the color components is disclosed. Moreover, the second method is disclosed by which the images of different color components are transferred at the same timing and the density of the multi-color image formed by layering the color components is measured.

As the first method, for example, the image forming apparatus disclosed in Japanese Patent Laid-Open No. 10-213940 is known. The image forming apparatus disclosed in Japanese Patent Laid-Open No. 10-213940 detects the distance between transfer positions of the images of different color components to perform correction based on the detected amount of displacement in the transfer positions. The apparatus detects the distance between the image formed by a base color component and the image formed by another color component by a sensor and determines the amount of displacement in the transfer positions of the images of the color components based on the detected distance, to correct color misregistration.

As the second method, the image forming apparatus disclosed in Japanese Patent Laid-Open No. 2000-81744 is known. The image forming apparatus disclosed in Japanese Patent Laid-Open No. 2000-81744 measures the density of the multi-color image formed by layering the images of different color components and corrects color misregistration such that the density is that obtained when the images of the color components are precisely aligned. This image forming apparatus repeatedly forms a plurality of images of the same shape for each color component in order to improve the correction accuracy. Specifically, a plurality of images having the same linear shape are formed for each color component, and the density of each multicolor line image is detected by a sensor in order to obtain the alignment state of the line images of different color components. It is then assumed that the line images of the color components are accurately aligned when the density of the multi-line image detected by the sensor is in the range of a predetermined density. Then, color adjustment is performed by providing correction such that the images are formed in the accurately aligned state.

The image forming apparatus disclosed in Japanese Patent Laid-Open No. 10-213940 that uses a sensor for detecting transfer positions of the images of different color components to obtain displacement in the transfer positions of the images, however, had a problem such that a sensor with high detection accuracy must be used to detect small displacements in transfer positions. Color adjustment requires accuracy of several microns. Incorporation of such a sensor has caused a problem of increased cost.

The image forming apparatus disclosed in Japanese Patent Laid-Open No. 2000-81744 needs to shift the adjustment value line by line over the entire area of image color adjustment to obtain an adjustment value at which a base image and a color component image to be a subject for adjustment are perfectly aligned. This requires detection of the density used at color correction for the entire area of the image color adjustable range, which disadvantageously increases the time required for color adjustment. Moreover, if the time required for adjustment is made shorter, the image color adjustable area cannot be so widened. In particular, color misregistration is caused by various reasons such as the temperature and moisture in the image forming apparatus, worn-out parts, and replacement of parts. Accordingly, besides at the time of factory shipment, regular corrections must be made even after delivery by a maintenance person or a user on the field. Thus, development of an image forming apparatus that can simply correct color misregistration with high accuracy has been requested.

BRIEF SUMMARY OF THE INVENTION

The present invention has been made with the aim of solving the problems above. An object of the present invention is to provide a correction method that is capable of correcting an adjustment value in a shorter time and with higher accuracy by changing an adjustment value within a predetermined range to determine adjustment value candidates, i.e., finely determining the adjustment value candidates in a predetermined range as the first adjustment, and then determining an optimal adjustment value in the entire adjustment area from the determined adjustment value candidates, i.e., roughly determining an adjustment value in the entire adjustment area as the second adjustment, and to provide an image forming apparatus used in the method, and a recording medium for realizing the function of the image forming apparatus.

Moreover, another object of the present invention is to provide an image forming apparatus that is capable of correcting an adjustment value in a shorter time when a maintenance person, a user or the like performs correction for color adjustment after delivery, by determining whether or not the second adjustment should be carried out and correcting the adjustment value only by the first adjustment if it is determined that there is no need to carry out the second adjustment.

The method of correcting an adjustment value for an image forming apparatus according to the present invention is a method of correcting a predetermined adjustment value for the image forming apparatus producing an image of each of separated colors in accordance with the adjustment value, including the steps of forming a first base image from a base color output in accordance with a predetermined adjustment vale and forming a first correction image from a correction color to be a subject for correction output in accordance with a value obtained by changing a predetermined adjustment value within a predetermined range, determining a first adjustment value from the changed adjustment values based on a density output from a sensor detecting the density of an image forming portion, forming a second base image from the base color output in accordance with a predetermined adjustment value and forming a second correction image from a correction color output in accordance with a plurality of adjustment values determined based on the first adjustment value, determining a second adjustment value from the plurality of adjustment value based on the density output from the sensor, and correcting the predetermined adjustment value for the correction color to the determined second adjustment value.

The image forming apparatus according to the present invention is an image forming apparatus producing an image of each of separated colors in accordance with a predetermined adjustment value, including a sensor detecting a density of an image forming portion, and a processor capable of performing the following operations including the steps of the first forming step of forming a first base image from a base color output in accordance with a predetermined adjustment value and forming a first correction image from a correction color to be a subject for correction output in accordance with a value obtained by changing a predetermined adjustment value within a predetermined range, determining a first adjustment value from the changed adjustment values based on the density output from the sensor, the second forming step of forming a second base image from a base color output in accordance with a predetermined adjustment value and forming a second correction image from a correction color output in accordance with a plurality of adjustment values determined based on the first adjustment value, determining a second adjustment value from the plurality of adjustment values base on the density output from the sensor, and a correction step of correcting the predetermined adjustment value for the correction color to the determined second adjustment value.

The recording medium according to the present invention is a recording medium recording a computer program for correcting a predetermined adjustment value for an image forming apparatus which produces an image of each of separated colors in accordance with the adjustment value, the computer program including the steps of making a computer form a first base image from a base color output in accordance with the predetermined adjustment value and form a first correction image from a correction color to be a subject for correction output in accordance with a value obtained by changing a predetermined adjustment value within a predetermined range, making a computer determine a first adjustment value from the changed adjustment values based on the density output from a sensor detecting the density of an image forming portion, making a computer form a second base image from a base color output in accordance with a predetermined adjustment value and form a second correction image from a correction color output in accordance with a plurality of adjustment values determined based on the first adjustment value, making a computer determine a second adjustment value from the plurality of adjustment values based on the density output from the sensor, and making a computer correct the predetermined adjustment value for the correction color to the determined second adjustment value.

In the present invention, a base color such as black for example is output in accordance with a predetermined adjustment value, to form a plurality of the first base images, each having a rectangular shape and the width of e.g. several dots. A correction color such as cyan for example that is to be a subject for correction is output on the first base image in accordance with a predetermined adjustment value, to form a plurality of the first correction images each having the rectangular shape and the width of e.g. several dots. Here, if there is no displacement, each of the first base images perfectly matches with each of the first correction images. In order to check the degree of matching, the adjustment value for the correction color is changed, at output, within a predetermined range, i.e., the first correction images are shifted at formation within the predetermined range, and the state of alignment is checked.

Then, the first adjustment value is determined from the changed adjustment values based on the density output from the sensor detecting the density of the image forming portion. Specifically, if the first base image and the first correction image are perfectly aligned with each other, the density has an extreme value compared to the case with misaligned images. Thus, an adjustment value obtained when the extreme value is output is determined as the first adjustment value. Subsequently, the base color is output in accordance with a predetermined adjustment values to form the second base images, while the correction color is output in accordance with a plurality of adjustment values determined based on the first adjustment value to form the second correction images. Specifically, the extreme value appears periodically with respect to the first adjustment values, and thus the second correction images are formed only for the adjustment value candidates, which are periodical with respect to the first adjustment value, of all the values in the entire area of adjustment.

Then, the second adjustment value having an extreme value is determined from the plurality of candidates based on the density output from the sensor. Finally, the adjustment value for the correction color is corrected to the determined second adjustment value. As such, fine adjustment is first performed on adjustment values only in a predetermined area of the entire adjustment area to determine the adjustment value candidates and then the final adjustment value is determined by sampling only the candidate adjustment values for the entire adjustment area. This allows correction of color misregistration in a shorter time and with higher accuracy compared to the conventional method that successively performs sampling for the entire area of adjustment.

In the image forming apparatus according to the present invention, the first forming step forms the first base images with the first interval and forms the first correction images based on an adjustment value changed within the range of the first interval.

In the present invention, the first base images are formed with the first interval (at every several dots for example), and the first correction images are formed with the adjustment value changed within the range of the first interval. For instance, the first base images of the rectangular shape each having the width of four dots are formed at cycles (interval) of every 11 dots (4 dots having an image and 7 dots having no image). The first correction images are formed with the adjustment value changed successively within the range of 11 dots. Then, the change in the density output from the sensor will be such that data having an extreme value at an aligned position can repeatedly be obtained with this interval (cycle). In other words, if one first adjustment value corresponding to the extreme value is determined, candidates for the first adjustment value which is the final adjustment value can be obtained periodically without image formation for the entire area of adjustment. Such a structure allows more efficient determination of the adjustment value to be corrected, resulting in color adjustment in a short time.

In the image forming apparatus according to the present invention, the first forming step forms the first base images and the first correction images having the same shape.

In the present invention, each of the first base images and the first correction images are formed to have the same shape. For instance, a plurality of rectangular images each having the width of 4 dots are formed at every 11 dots. The images of the same shape are thus formed, so that the extreme value of the density output from the sensor shows a significant peak, allowing the adjustment value to be determined with higher accuracy.

In the image forming apparatus according to the present invention, the second forming step forms the second base images, based on the first interval, from the base color output in accordance with the predetermined adjustment value, and forms the second correction images, based on the first interval, from the correction color output in accordance with the plurality of adjustment values determined based on the first adjustment value and the first interval.

In this invention, the second base images and the second correction images are formed based on the first interval. In the example above, the second base images are formed, each having the width of an integer multiple (88 dots for example) of the first interval, with an interval of also an integer multiple (every 99 dots; an image is formed for 88 dots while no image is formed for 11 dots). By contrast, the second correction images are formed, each having the width of an integer multiple (11 dots for example) of the first interval, with an interval of also an integer multiple (every 99 dots; an image is formed for 11 dots while no image is formed for 88 dots). Such images are formed for each of the adjustment values specified based on the first adjustment value and the first interval. In the example above, the adjustment value is shifted by every 11 dots starting from the determined first adjustment value, to form the second base images and the second correction images based on the first interval. That is, the correction images, each having the width of 11 dots, are formed at every 11 dots.

The image formed based on the adjustment value presenting a perfect match, of all the plurality of adjustment values specified based on the first adjustment value, is completely covered by the base color and the correction color and takes an extreme value, so that the second adjustment value is determined. This second adjustment value is then set as the adjustment value after correction. Specifically, if perfect color adjustment is achieved when the correction color having the width of 11 dots forms images at every 11 dots, a gap of 11 dots where no image of the base color is formed is filled with the 11 dots of the correction color and the density here has an extreme value, so that the adjustment value obtained here is determined as the true adjustment value. As such, the second base images and the second correction images are layered based on the first interval used in forming the first base images, allowing correction with higher accuracy. Moreover, the density is detected only for the adjustment values specified based on the first adjustment value and the first interval, also allowing correction in a shorter time.

In the image forming apparatus according to the present invention, the processor is further capable of performing the step of defining the plurality of adjustment values determined based on the first adjustment value and the first interval such that the adjustment values fall within a predetermined range.

In the present invention, the plurality of adjustment values determined based on the first adjustment value and the first interval are defined to be within a predetermined range. By thus changing the adjustment value only in the defined range, not in the entire adjustable area, correction can be made in a shorter time if fine adjustment is required.

In the image forming apparatus according to the present invention, each of the second base images and the second correction images has a rectangular shape and a width corresponding to an integer multiple of the first interval.

In the image forming apparatus according to the present invention, the processor is further capable of performing the step of determining whether or not image formation by the second forming step is to be executed, and the correction step corrects the predetermined adjustment value for the correction color to the determined first adjustment value if it is determined that no image formation by the second forming step is to be executed.

In the present invention, it is determined whether or not formation of the second base images and the second correction images is executed. If it is determined that the formation of the second base images and the second correction images is not executed because such a condition is satisfied that a maintenance person, a user or the like enters an instruction not to execute formation of the second base images and the second correction images using an operation unit, or that the number of image formations after delivery reaches a certain number, only the first base images and the first correction images are formed to determine the first adjustment value. Then, the determined first adjustment value is set as an adjustment value for the correction color. As such, the color adjustment in the second stage may appropriately be omitted, allowing color adjustment to be performed readily in a shorter time at simple maintenance.

In the image forming apparatus according to the present invention, the step of determining the first adjustment value determines the first adjustment value based on an adjustment value at which the density output from the sensor for the first base image formed by the first forming step and for the first correction image formed in accordance with the changed adjustment value takes a maximum value or a minimum value.

In the image forming apparatus according to the present invention, the step of determining the second adjustment value determines the second adjustment value based on an adjustment value at which the density output from the sensor for the second base image formed by the second forming step and for the second correction image formed in accordance with the plurality of adjustment values takes a maximum value or a minimum value.

In the image forming apparatus according to the present invention, the first forming step forms a plurality of first base images and a plurality of first correction images, each having the same rectangular shape, with an interval longer than twice a short side length of each of the first base images and the first correction images.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanatory view showing a record layout of an adjustment value table;

FIGS. 14A and 14B are flowcharts showing the procedure of the correction process according to the second embodiment of the present invention;

DESCRIPTION OF THE PREFERRED EMBODIMENTS

First Embodiment

Figure 1:
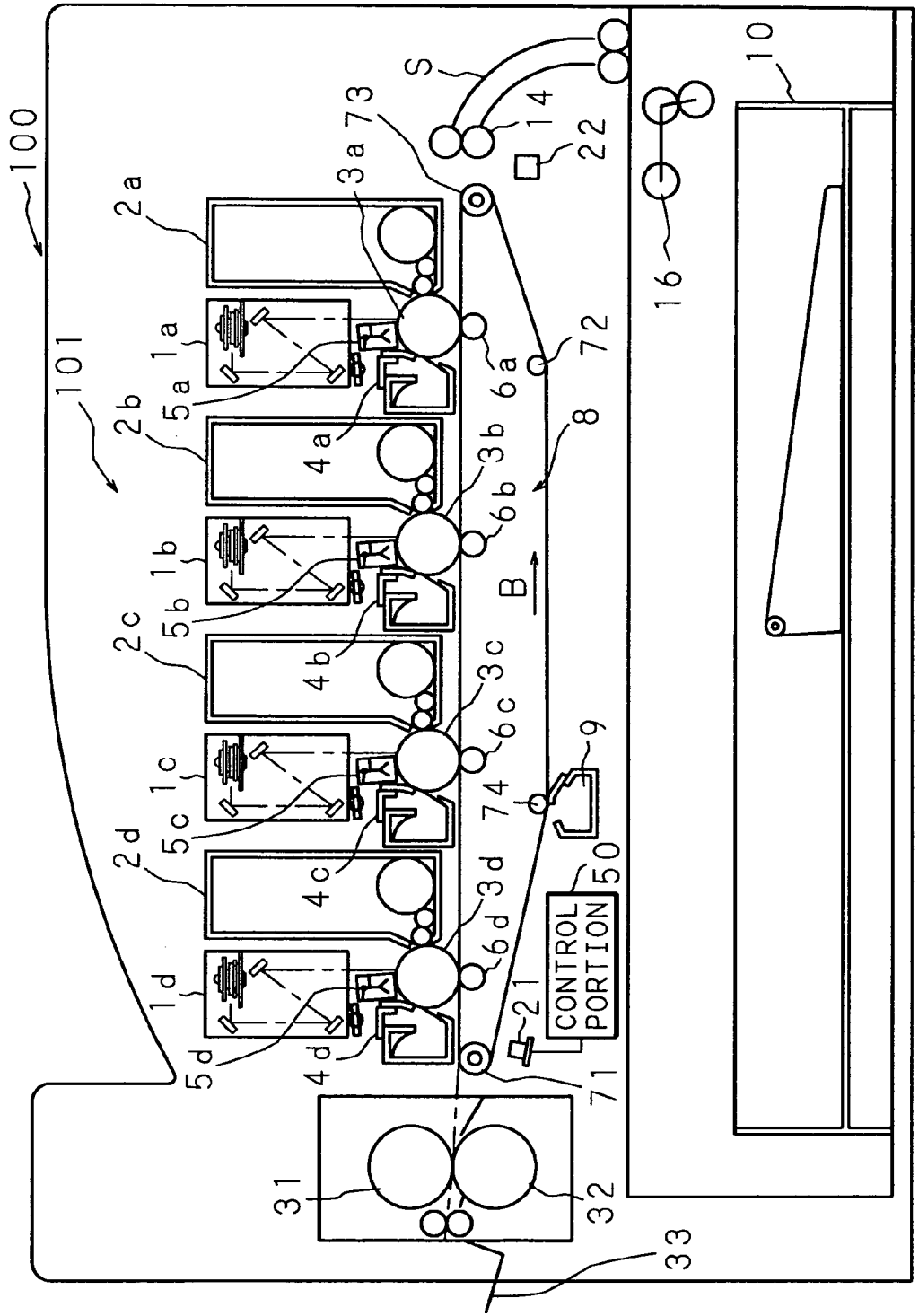
FIG. 1 is a schematic section view showing the outline of the image forming apparatus according to the present invention.

FIG. 1 is a schematic section view showing the outline of the image forming apparatus according to the present invention. The following explanation is given based on the assumption that an image forming apparatus 100 according to the present invention is a copying machine. It is, however, not limited thereto, and may also be a composite machine having the function of a facsimile or a printer in addition to the copying function.

The image forming apparatus 100 includes, as a structure related to correction for color misregistration, an image forming station 101, a transfer conveyer belt unit 8, a registration detection sensor 21, and a temperature and moisture sensor 22, as shown in FIG. 1. The image forming station 101 in the image forming apparatus 100 includes four exposure units 1a, 1b, 1c and 1d, four development devices 2a, 2b, 2c and 2d, four photosensitive drums 3a, 3b, 3c and 3d, four cleaner units 4a, 4b, 4c and 4d, and four charging devices 5a, 5b, 5c and 5d, in order to form four kinds of latent images corresponding to four colors of black (K), cyan (C), magenta (M) and yellow (Y) that are used to form a multi-color image. It is noted that the reference characters a, b, c and d above are described corresponding to black (K), cyan (C), magenta (M) and yellow (Y), respectively. In the following description, the members provided for each color may representatively be indicated as an exposure unit 1, a development device 2, a photosensitive drum 3, a cleaner unit 4 and a charging device 5, except for the case where a member corresponding to a specific color is designated.

The exposure unit 1 is a laser scanning unit (LSU) provided with a laser directing portion and a reflection mirror, or is a write head of e.g. an EL (ElectroLuminescence) or an LED (Light Emitting Diode) in which light emitting devices are arranged in an array. Note that the description in the present embodiment will be made for the example where the LSU is applied. The exposure unit 1 performs light exposure in response to input image data at the timing in accordance with an adjustment value, to form an electrostatic latent image corresponding to the image data on the photosensitive drum 3. The adjustment value is stored in an adjustment value table, which will be described later, for each color. Color-separated image data is irradiated by each of the exposure units 1a, 1b, 1c and 1d at the timing in accordance with the adjustment value. The electrostatic latent images of the colors are layered and exposed to light.

The development device 2 develops the electrostatic latent images formed on the photosensitive drum 3. The photosensitive drum 3 is disposed at around the central part of the image forming apparatus 100 and forms an electrostatic latent image or a toner image on its surface in accordance with input image data. The cleaner unit 4 removes and collects the toner remaining on the photosensitive drum 3 after developing and transferring the electrostatic latent image formed on the surface of the photosensitive drum 3. The charging device 5 uniformly charges the surface of the photosensitive drum 3 to a predetermined electric potential. For the charging device 5, besides a roller type or a blush type abutting the photosensitive drum 3, a charger type not abutting the photosensitive drum 3 may also be used. It is noted that, in the present embodiment, the description will be made for the example where the charging device of the charger type is applied.

The transfer conveyer belt unit 8 is disposed below the photosensitive drum 3, including transfer rollers 6a, 6b, 6c and 6d, a transfer belt 7, a transfer belt cleaning unit 9, a transfer belt driving roller 71, a transfer belt tension roller 73, and transfer belt driven rollers 72 and 74. It is noted that the four transfer rollers 6a, 6b, 6c and 6d corresponding to the four colors respectively, are collectively indicated as a transfer roller 6 in the following description. The transfer roller 6 is rotatably supported by an inside frame and holds the transfer belt 7 with tension in cooperation with the transfer belt driving roller 71, the transfer belt tension roller 73, and the transfer belt driven rollers 72 and 74. The transfer roller 6 has its base made of a metal shaft having the diameter of 8 to 10 mm and its surface covered by a conductive elastic material such as EPDM (Ethylene Propylene Diene Monomer) or foam urethane.

Papers are stacked in a paper-feeding cassette 10. The rotation of a paper-feeding roller 16 preceding the rotation of the photosensitive drum 3 feeds the papers in the paper-feeding cassette 10 one by one into a paper conveying path S. The fed papers are conveyed by the paper-feeding roller 16 to a register roller 14. The papers are at a halt with their front ends abutting the register roller 14 which rotates at a predetermined timing to direct the papers toward the photosensitive drum 3. The papers are conveyed to the image forming station 101 where the toner image carried on the photosensitive drum 3 is transferred onto the papers by the transfer roller 6 to which a predetermined transfer bias is applied. The transfer roller 6 can uniformly apply to the papers or the transfer belt 7 a high voltage of a polarity opposite to the charge polarity of the toner, and transfers the toner image formed on the photosensitive drum 3 onto the transfer belt 7 or the paper attached and conveyed on the transfer belt 7.

The transfer belt 7 is formed of polycarbonate, polyimide, polyamide, polyvinylidene fluoride, polytetrafluoroethylene polymer, ethylene-tetrafluoroethylene polymer or the like with the thickness of approximately 100 μm, and is arranged in contact with the photosensitive drum 3. The toner image of each color formed at the photosensitive drum 3 is successively transferred onto the transfer belt 7 or the paper attached and conveyed on the transfer belt 7, to form a multi-color toner image. Heat and pressure is applied to the paper having the transferred image while the paper passes through fixation rollers 31 and 32. This allows the toner image to melt and to be fixed on the paper. Finally, the paper with the formed image is discharged into a paper discharge tray 33.

The transfer belt 7 has the thickness of approximately 100 μm and is formed endlessly with a film. The transfer belt driving roller 71, the transfer belt tension roller 73, and the transfer belt driven rollers 72 and 74 together hold the transfer belt 7 with tension to drive and rotate the transfer belt 7. The transfer belt cleaning unit 9 removes and collects the toner for color adjustment and the toner for process control that are directly transferred onto the transfer belt 7 as well as the toner adhered due to the contact with the photosensitive drum 3. The registration detection sensor 21 is provided at a position after the transfer belt 7 has passed through the image forming station 101 and before it reaches the transfer belt cleaning unit 9, since it detects patch images formed on the transfer belt 7. The registration detection sensor 21 detects the density of the patch images formed on the transfer belt 7 at the image forming station 100, and outputs a signal corresponding to the density to a control portion 50.

The temperature and moisture sensor 22 detecting the temperature and moisture within the image forming apparatus 100 is provided near a process portion where no rapid change in temperature or moisture occurs. At the image forming station 101 in the image forming apparatus with the above structure, the exposure unit 1 successively exposes each color to light at the timing in accordance with the adjustment value from the control portion 50 based on the input image data, so that an electrostatic latent image is formed on the photosensitive drum 3. Subsequently, the toner image developed from the electrostatic latent image by the development portion 2 is formed, which is then transferred onto the transfer belt 7 or the paper attached and conveyed on the transfer belt 7. The transfer belt 7 is driven to rotate while being held with tension by the transfer belt driving roller 71, the transfer belt tension roller 73, and the transfer belt driven rollers 72 and 74. Thus, the toner image of each color component is successively transferred and layered onto the transfer belt 7 or the paper attached and conveyed on the transfer belt 7, to form a multi-color toner image. Note that the multi-color toner image is further transferred onto a paper if the multi-color toner image is formed on the transfer belt 7.

At color adjustment performed in the image forming apparatus 100 of the present embodiment, the toner image of each color component formed at the above-described image forming station 101 is transferred onto the transfer belt 7. Here, a toner image to be a base (hereinafter referred to as a "base patch image") of all the toner images of different color components is first transferred onto the transfer belt 7, and then a toner image of another color component that is to be a subject for correction for color misregistration (hereinafter referred to as a "correction patch image") is transferred on the base patch image. Although the base patch image and the correction patch image are formed on the transfer belt 7 in the present embodiment, it is not limited thereto, and color adjustment may also be performed by detecting the density of an image formed on a paper by the registration detection sensor 21 provided between the image forming station 101 and the paper discharge tray 33.

Figure 2:
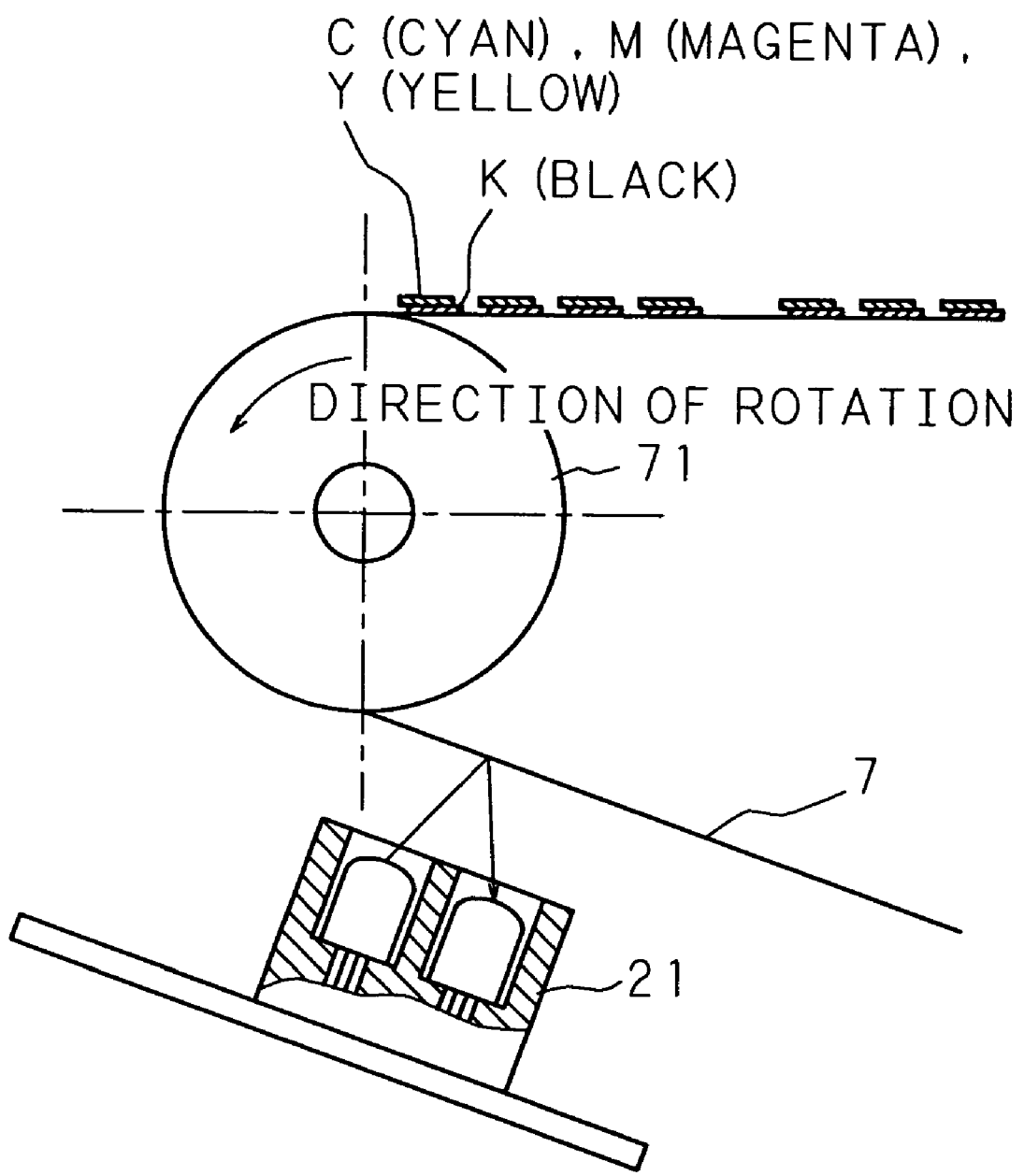
FIG. 2 is a schematic section view showing the substantial parts of a registration detection sensor and a transfer belt driving roller.

FIG. 2 is a schematic section view showing the substantial part of the registration detection sensor 21 and the transfer belt driving roller 71. The transfer belt 7 is driven to rotate by the transfer belt driving roller 71 arranged at the transfer conveyer belt unit 8. Thus, as shown in FIG. 2, when base patch images K (black) and correction patch images C (cyan) (or M (magenta) or Y (yellow)) that are formed on the transfer belt 7 reaches the position of the registration detection sensor 21, the registration detection sensor 21 detects the density of the base patch images and the correction patch images onto the transfer belt 7. The registration detection sensor 21 emits (irradiates) light to the transfer belt 7 and detects the light reflected on the transfer belt 7, to detect the density of the base patch images and the correction patch images.

The detected density is output to the control portion 50, which corrects the timing of exposure by the exposure unit 1 and the timing of writing onto the photosensitive drum 3 based on the detected result. It is noted that, though the registration detection sensor 21 is arranged such that the light emitting position of the emitting light and the detection position of the reflected light are parallel to the conveying direction of the transfer belt 7 as shown in FIG. 2, it is not limited thereto. The sensor 21 may also be arranged such that the light emitting position of the emitting light and the detection position of the reflected light are perpendicular to the conveying direction of the transfer belt 7, or such that the transfer belt 7 is made of a light permeable material while the light emitting portion and the light receiving portion are arranged opposite to each other with the transfer belt 7 interposed.

Although the registration detection sensor 21 in the present embodiment has the structure as described above, it is not limited thereto, and may also employ a CCD (Charge Coupled Device) producing a brightness or luminance signal, as long as the patch images can be used to examine the state of the formed images. It is noted that the process speed of image formation is 100 mm/sec, and thus the detection by the registration detection sensor 21 is performed at sampling periods of 2 m/sec.

Figure 3:
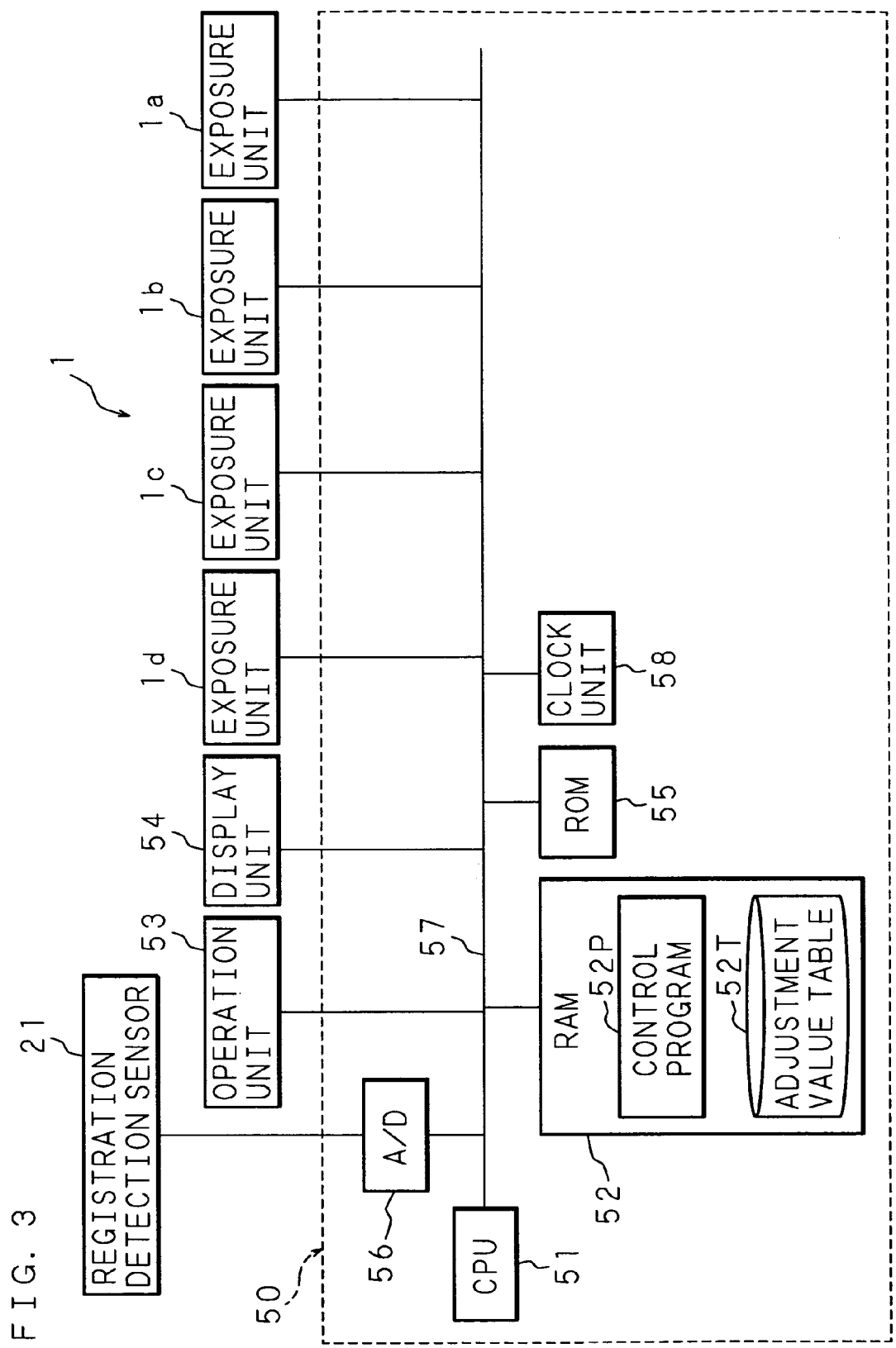
FIG. 3 is a block diagram showing the hardware configuration of a control portion.

FIG. 3 is a block diagram showing the hardware configuration of the control portion 50. As shown in FIG. 3, a RAM (Random Access Memory) 52, a ROM (Read Only Memory) 55, a display unit 54 such as a liquid crystal display, an operation unit 53 provided with various input keys such as numeric keys and a start key, a clock unit 58 producing date and time information, an A/D converter 56, and an exposure unit 1 are connected to a CPU (Central Processing Unit) 51 via a bus 57.

The CPU 51 is connected to each of the above-described hardware parts of the control portion 50, to control them while executing various kinds of software functions in accordance with a control program 52P stored in the RAM 52. The display unit 54 is a display device such as a liquid crystal display device, for displaying the operation state of the image forming apparatus 100 according to the present invention. The operation unit 53 is provided with letter keys, numeric keys, short dial keys, one-touch dial keys, various types of functions keys and the like that are required for operation of the image forming apparatus 51 of the present invention. Note that a touch panel system may also be employed for the display unit 54 to substitute for a part or all of the various keys of the operation unit 53.

The electric signal indicating the density output from the registration detection sensor 21 is converted at the A/D converter 56 into, for example, an 8-bit 256-gradation digital signal, which is output to the CPU 51. The RAM 52, which is formed of an SRAM (Static Random Access Memory), a flash memory or the like, stores temporary data generated at the execution of software. Moreover, an adjustment value table 52T is installed in the RAM 52.

FIG. 4 is an explanatory view showing a record layout of the adjustment value table 52T. An adjustment value is stored for each of the exposure units 1a to 1d for each color. The adjustment value is represented by dots, corresponding to the timing of exposure (msec). The values of 0 to 99 dots are used to indicate the timing of exposure. In the illustrated example, the adjustment value of 0 is stored for the exposure unit 1a of black, whereas the adjustment value of 11 is stored for the exposure unit 1b of cyan. Likewise, the adjustment value for the exposure unit 1c of magenta and the exposure unit 1d of yellow are also stored in advance. If it is assumed that the exposure timing corresponding to the adjustment value 0 is time $T_0$, the exposure timing corresponding to the adjustment value 11 is $T_0+\Delta T_{11}$ (msec), which is $\Delta T_{11}$ (msec) later. Thus, the CPU 51 controls the exposure units 1a to 1d with reference to the adjustment value table 52T, to drive the exposure unit 1b $\Delta T_{11}$ (msec) after driving of the exposure unit 1a of black. The adjustment value is stored color by color and is corrected to an optimal value by color correction of the present invention. If the adjustment value is, for example, shifted by one by the correction and assumes 10, the CPU 51 drives the exposure unit 1a at $T_0$ (msec), and thereafter drives the exposure unit 1b at $T_0+\Delta T_{10}$ (msec), resulting that the image of cyan is formed at a position displaced by 1 dot compared to the example above. It is noted that the adjustment value table 52T stores not only the adjustment values in the sub scanning direction as shown in FIG. 4, but also the adjustment values in the main scanning direction that are not shown. The actual exposure timing, however, is also considered the time corresponding to the distance between the base exposure unit and the exposure unit to be a subject for correction. (Since this time is fixed at a predetermined value for each exposure unit to be the subject for correction, the time is not described here).

The color adjustment method by the image forming apparatus 100 with the structure above is now described in detail. The color adjustment method of the present embodiment includes the first color adjustment and the second color adjustment. In the present embodiment, an example is described where the toner image of K (black) is used as a base patch image while the toner image of C (cyan) is used as a correction patch image, and where the range of color adjustment extends over 99 dots (lines) (the start position is set as 0 dot and the end position is set as 99 dot) in the conveying direction of the transfer belt 7. Note that any color may be used for the toner image of the base patch image or the correction patch image, not particularly limited to the colors described here. In addition, the range of color adjustment is not particularly limited if it falls within the range detectable by the registration detection sensor 21.

Figure 5:
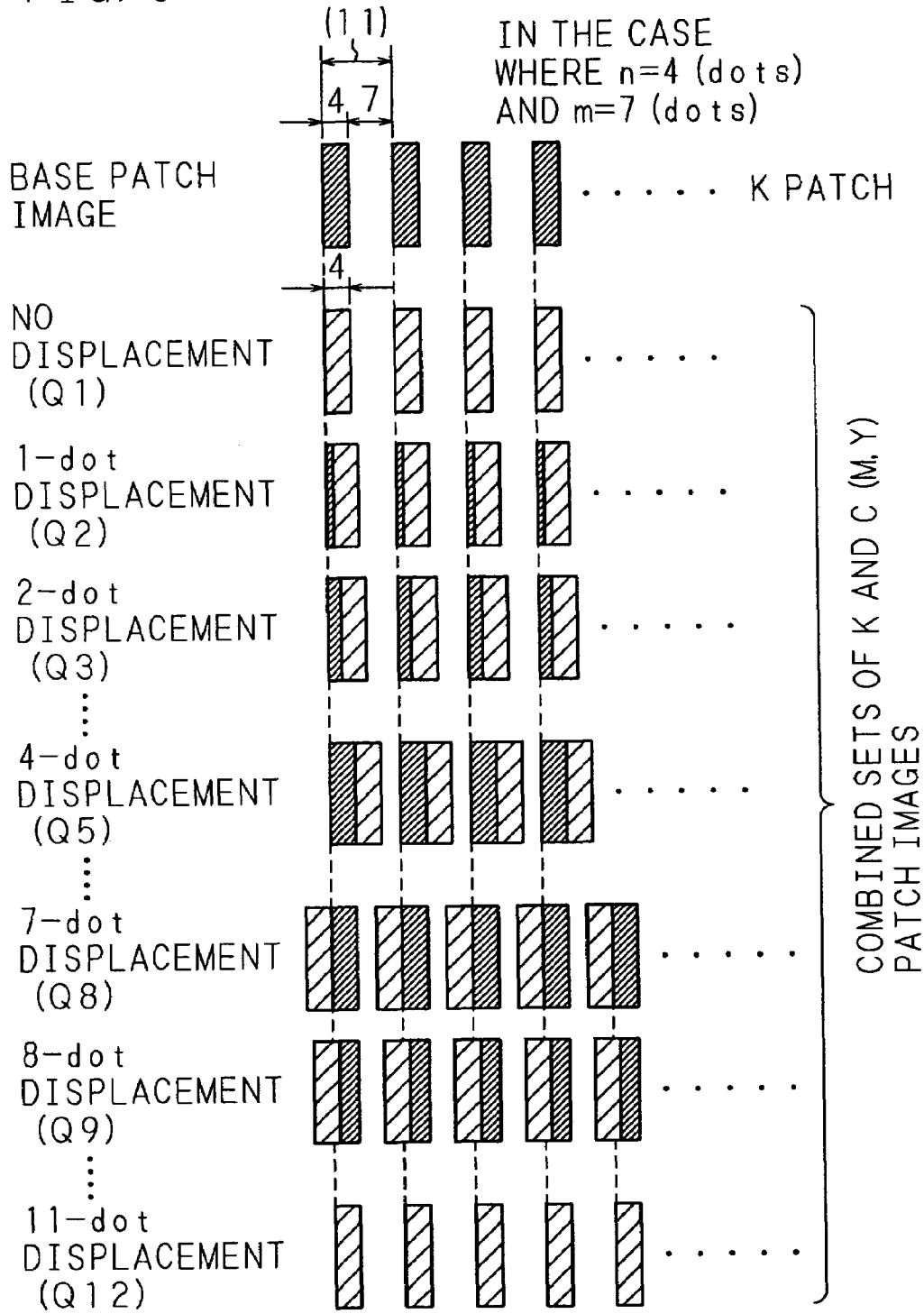
FIG. 5 is an explanatory view showing patch images formed in a sub scanning direction.

The color adjustment by the image forming apparatus 100 of the present embodiment is performed by forming the base patch images and correction patch images including a plurality of lines in the direction perpendicular (hereinafter referred to as "main scanning direction") to the conveying direction (hereinafter referred to as "sub scanning direction") of the transfer belt 7. FIG. 5 is an explanatory view showing the patch images formed in the sub scanning direction. In the first color adjustment, as shown in FIG. 5, for example, the pitch for image forming patterns (the first interval (m+n)) is set as 11 dots consisting of 4 dots of the line width n and 7 dots of the line gap m, to form the base patch images (hereinafter referred to as "base lines") on the transfer belt 7 (K patch in FIG. 5). After the base lines are formed, correction patch images (hereinafter referred to as "correction lines"), each having the same line width n and line gap m as those of the base line, is further formed. It is noted that images are formed with 600 dpi in the present embodiment.

Figure 6:
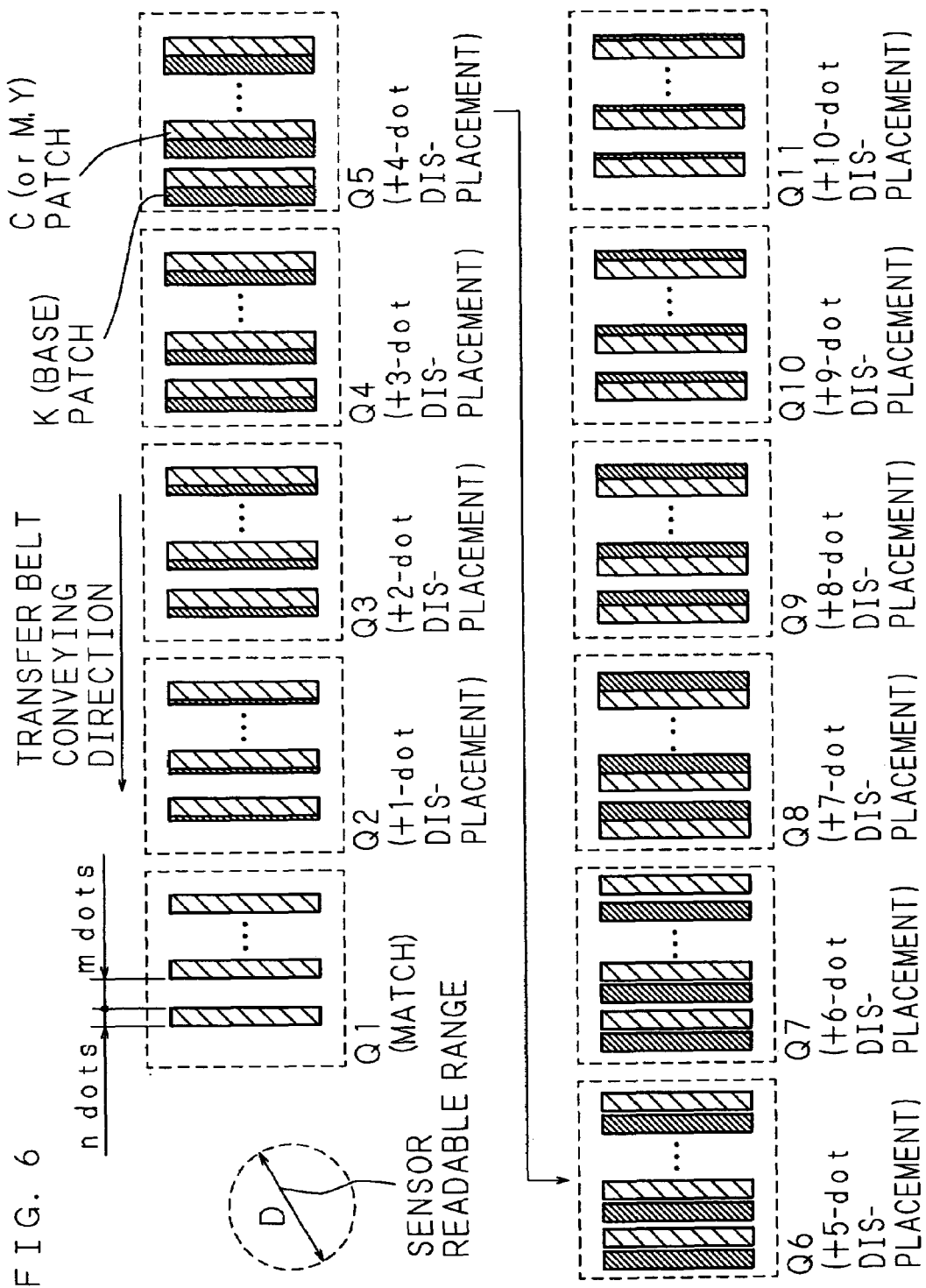
FIG. 6 is an explanatory view showing a plurality of patch images formed in the sub scanning direction.

Subsequently, the density of the base lines and the correction lines formed on the transfer belt 7 are detected by the registration detection sensor 21. FIG. 6 is an explanatory view showing a plurality of patch images formed in the sub scanning direction. The registration detection sensor 21 detects the density of the base lines and the correction lines in a sensor readable range D, as shown in FIG. 6 (indicating the images formed on the transfer belt 7). The sensor readable range D in the present embodiment has the diameter of approximately 10 mm, allowing averaging of detection errors due to color misregistration caused by fine (small) vibration or the like. The base patch images and correction patch images form a set of images including several tens of images under one condition. A plurality of sets of images are formed under a variety of other conditions.

The density of a base line and a correction line on the transfer belt 7 changes depending on the state of alignment of the base line and the correction line on the transfer belt 7. This means that the detection value of reflected light detected by the registration detection sensor 21 changes depending on the alignment state of the base line and the correction line. The result of the density detected by the registration detection sensor 21 changes depending on the area of the base line and the correction line formed on the surface of the transfer belt 7. It the area is minimum, i.e., if the base line is perfectly aligned with the correction line, the amount of absorption of the light emitted from the registration detection sensor 21 by the base line and the correction line decreases while the reflected light from the transfer belt 7 is increased to the maximum, resulting in an increased density value to be output. This excludes the case where the transfer belt 7 is transparent.

If such a color correction program is executed, the CPU 51 refers to the adjustment value table 52T, and forms the image of a base line based on the predetermined adjustment value (e.g. 0) while forming the image of a correction line based on the predetermined adjustment value (e.g. 11). A plurality of (e.g. 100) base lines and correction lines are formed as shown in FIG. 6. Subsequently, the CPU 51 measures the density at sampling periods of 2 msec and stores the result into the RAM 52. When a predetermined time period has elapsed, an average of the stored density is obtained and stored into the RAM 52. Although, in the present embodiment, sampling is performed many times for a plurality of density data output from registration detection sensor 21 and the average thereof is obtained in order to improve the measurement accuracy, the sampling may also be performed only once for comparing the output thereof at each of the adjustment values.

Thereafter, the process of changing the adjustment value is performed as will be described below. The CPU 51 forms the correction lines by incrementing the adjustment value for the correction color in the adjustment value table 52T (Q2 in FIG. 5). Even if a change is made, the density data are similarly measured and the average density is stored into the RAM 52 by associating it with the information of the adjustment value. Such a process is performed for the number of dots (m+n dots: 11 dots) corresponding to a predetermined number of pitches.

The above-described process is further described in detail with reference to FIG. 6. If the base line and the correction line are perfectly aligned with each other, the average of density stored in the RAM 52 takes an extreme value. This indicates that image formation under the condition of the average taking an extreme value of maximum (or minimum if, for example, a transparent transfer belt is used) can obtain the perfect alignment of the base line with the correction line. The first color adjustment in the present embodiment performs color adjustment by obtaining an extreme of the average of density, noting that an extreme can be obtained when the base line is perfectly aligned with the correction line.

Since a non-transparent black transfer belt 7 is used in the present embodiment, the average of density output from the registration detection sensor 21 takes the maximum value when the base line is perfectly aligned with the correction line. Accordingly, the correction line to be formed on the base line image is shifted at an arbitrary timing so as to change the alignment state of the base line and the correction line. The average of density output from the registration detection sensor 21 is obtained for each state and the maximum thereof is obtained.

Specifically, as described earlier, if the base line and the correction line are perfectly aligned with each other when there are a plurality of lines each having the line width n of 4 dots and the line gap m of 7 dots, the base line is completely covered by the correction line as indicated by Q1 shown in FIG. 6. Thus, the registration detection sensor 21 detects the density of repeated images, each having the line width of 4 dots, i.e. 4 dots for the base line and 4 dots for the correction line that are aligned with each other, and the line gap of 7 dots.

It is now assumed that the correction line is shifted by 1 dot from the position where the base line is formed, in the direction perpendicular to the main scanning direction (in the sub scanning direction) (displacement of +1 dot). The base line is then not completely covered by the correction line, resulting in misalignment, as indicated by Q2 shown in FIG. 6. Thus, the registration detection sensor 21 detects the line width of 5 dots, i.e. the line width of 4 dots for the base line plus 1 dot for the displaced portion of the correction line of 4 dots, and the line gap of 6 dots. In other words, the registration detection sensor 21 detects the density of the repeated images having the line width of 5 dots formed by the base line and the correction line and the line gap of 6 dots.

As such, if the correction line is shifted dot by dot in a direction perpendicular to the main scanning direction from the state indicated by Q1, the alignment state of the base line and the correction line changes as shown in Q1 to Q12 in FIGS. 5 and 6. If there is a displacement of +11 from the Q1 state, the line width of 4 dots and the line gap of 7 dots for the correction line recur, again showing the perfect alignment of the base line with the correction line. That is, the state where the correction line is displaced by 11 dots is the same as the state of the correction line before shifting, which is repeated every time the correction line is displaced by 11 dots. Accordingly, creation and detection of the base lines and correction lines are terminated when the displacement reaches 10 dots after shifting dot by dot from a predetermined state (e.g., the median in the color adjustable range; the median of "50" if the adjustable range is between "0" and "99"). That is, eleven types of correction lines are formed on the base lines (adjustment values: 50-60) and the density is detected for each of the layered lines. Even if the detection of the density is performed at 12 dots (adjustment value "61"), 13 dots (adjustment value "62") . . . , the same average density is periodically output. The process is therefore terminated after the measurement for one period.

Thus, the first color adjustment is performed under eleven conditions (within the range of adjustment for 11 dots in the color adjustable range), to estimate candidates for an adjustment value for the exposure timing at which a color component image to be a base and another color component image to be a subject for adjustment (correction) are perfectly aligned with each other.

Figure 7:
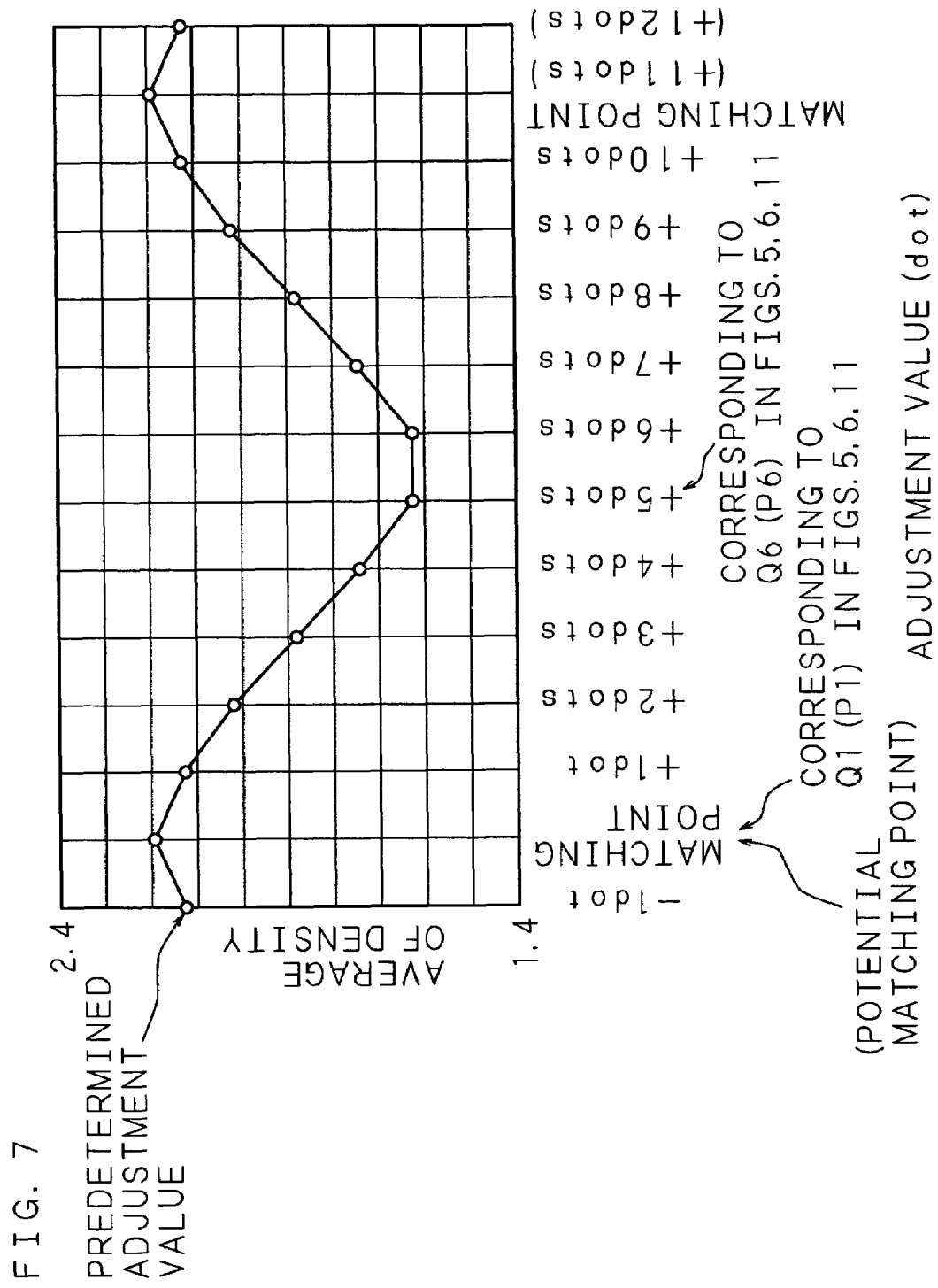
FIG. 7 is a characteristic view showing transition of the average value of density.

FIG. 7 is a characteristic view showing the transition of the average of density, illustrating an example plot of the average values of actually-detected output values. In FIG. 7, the vertical axis indicates the average of the values (voltage V) output from the registration detection sensor 21. The horizontal axis indicates the adjustment value by the unit of dot. FIG. 7 is a plot of the characteristic change in the average of density obtained when the adjustment value for a correction color is changed by a predetermined pitch (the first interval of 11 dots), with a predetermined adjustment value of the correction color set as a base point. When the base line and the correction line are perfectly aligned with each other ("potential matching point" in FIG. 7), the average of density reaches the maximum. (Since the initial state is −1 dot displaced in this example, the base line and the correction line are potentially aligned with each other when displaced by 1 dot. If the initial value is assumed to be "50," this is the state displaced by −1 dot, and "51" is the adjustment value that can obtain the potential alignment.)

The characteristic changes periodically as the adjustment value is further changed, additionally presenting extreme values at positions displaced by +11 dots (adjustment value "62"), +22 dots (adjustment value "73"), +33 dots (adjustment value "84"), +44 dots (adjustment value "95"), −11 dots (adjustment value "40"), −22 dots (adjustment value "29"), −33 dots (adjustment value "18"), and −44 dots (adjustment value "7"). One of these nine points is the condition of true matching. At this stage, candidates for the true matching point can be predicted. Since color misregistration is significant especially at factory shipment, there is a low possibility that the adjustment value first taking the extreme (50 in the example above) is the true adjustment value.

Subsequently, the second color adjustment is performed so as to determine one adjustment value (the second adjustment value) from the candidates for the adjustment value (the first adjustment value) determined by the first color adjustment. The second color adjustment is to obtain an adjustment value for a true matching point at which a color component image to be the base and another color component image to be the subject for adjustment (correction) are perfectly aligned with each other, i.e., a point selected from the adjustment value ("51") obtained by the first color adjustment and the adjustment value candidates that can be obtained from the adjustment value. In the second color adjustment, the exposure unit 1 is exposed to light for writing onto the photosensitive drum 3 based on the timing at the maximum adjustment value obtained by the first color adjustment, to form base patch images and correction patch images on the transfer belt 7.

The base patch images and the correction patch images here are formed based on the pitch (the first interval) used at the first color adjustment. Specifically, the number of dots d (d=m+n) for one pitch of the base line and the correction line in the first color adjustment is used as a base. That is, the line width of the base patch image is set as eight times the number of dots d and the line gap of the base patch images is set as d, whereas the line width of the correction patch image is set as d and the line gap of the correction patch image is set as eight times the number of d.

The example above is further described in detail. If n is 4 dots and m is 7 dots in the first color adjustment, the base patch image has the line width 8d of 88 dots and the line gap d of 11 dots, whereas the correction patch image has the line width of 11 dots and the line gap 8d of 88 dots. As such, the line width of the base patch image is 88 dots if it is set as eight times the number of dots d, resulting in the color adjustment range of d+8d, i.e. 0-99 dots. The range of color adjustment may be narrower or wider by increasing or reducing this 8-fold. Although the adjustment value equivalent to the timing of exposure $(T_0+\Delta T_i)$ is described as having the range of 0-99 in the present embodiment, it is not limited thereto, and the adjustment value may be made adjustable in the range, for example, between 0 and 110 dots.

As such, the line width (8d) of each of the base patch images and the line gap (8d) for the correction patch images in the second color adjustment may be set in accordance with the range of color adjustment. That is, they may be set such that the pitch for the image forming pattern of the base patch images or the correction patch images corresponds to the number of dots for the range of required color adjustment.

When the second color adjustment is performed, the CPU 51 determines the line width and the line gap for both the base patch images and the correction patch images based on the pitch (the first interval: 11) used in the first color adjustment. Then, for the base patch images, image formation is commenced by setting the adjustment value (0) stored in the exposure unit 1a field in the adjustment value table 52T as the timing of exposure. As for the correction patch images, a plurality of adjustment value candidates (7, 18, 29, 40, 51, 62, 73, 84, and 95) that are determined based on the first adjustment value (51) and the first interval (11) are first determined and stored in the RAM 52. The correction patch images are then formed with the timing of exposure in accordance with the plurality of adjustment values. The correction patch images are formed, shifted d dots by d dots, and the density thereof output from the registration detection sensor 21 are measured.

Figure 8:
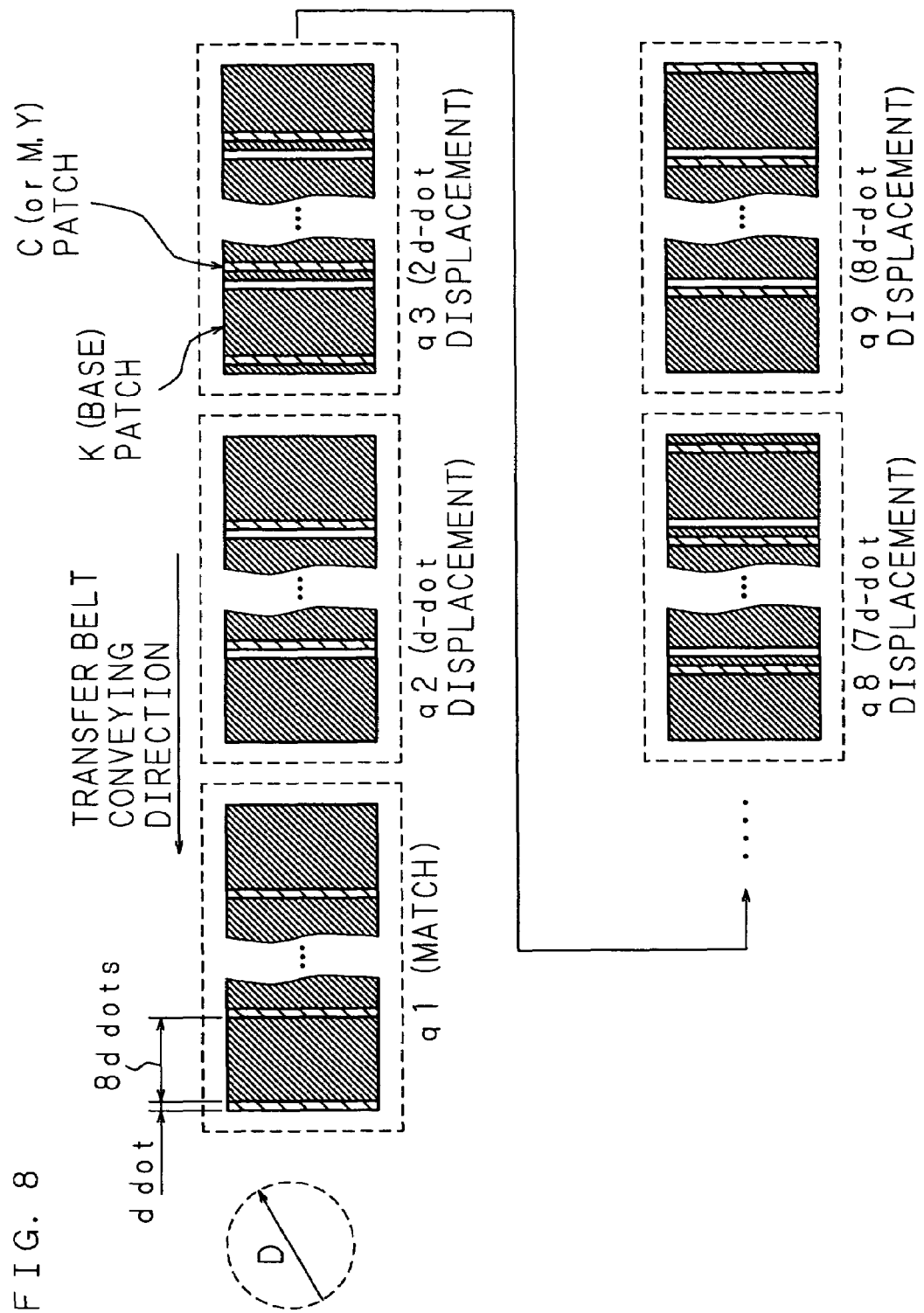
FIG. 8 is an explanatory view showing the image of base patch images and correction patch images formed in the sub scanning direction.

FIG. 8 is an explanatory view showing the image of base patch images and correction patch images formed in the sub scanning direction. In the second color adjustment, the forming positions of the base patch images and the correction patch images are set such that they are completely displaced from each other when the position of a base color component image completely matches with the position of another color component image that is to be a subject for adjustment (correction). Accordingly, as indicated by q1 in FIG. 8, the adjustment value obtained when the registration detection sensor 21 detects the state where a correction patch image is formed in the gap between base patch images, i.e., the state where the base patch images and correction patch images are continuously connected with each other (the state where no gap is formed in the sub scanning direction on the transfer belt 7) is the adjustment value for the true matching point.

When, on the other hand, the forming positions of the base patch images and the correction patch images are not perfectly aligned but displaced from the q1 state, correction patch images are formed on the base patch images as indicated by q2-q9 in FIG. 8. This means that the adjustment value obtained here is for the state where a base color component image and another color component image that is to be a subject for adjustment (correction) are misaligned, and is not corresponding to the true matching point.

Figure 9:
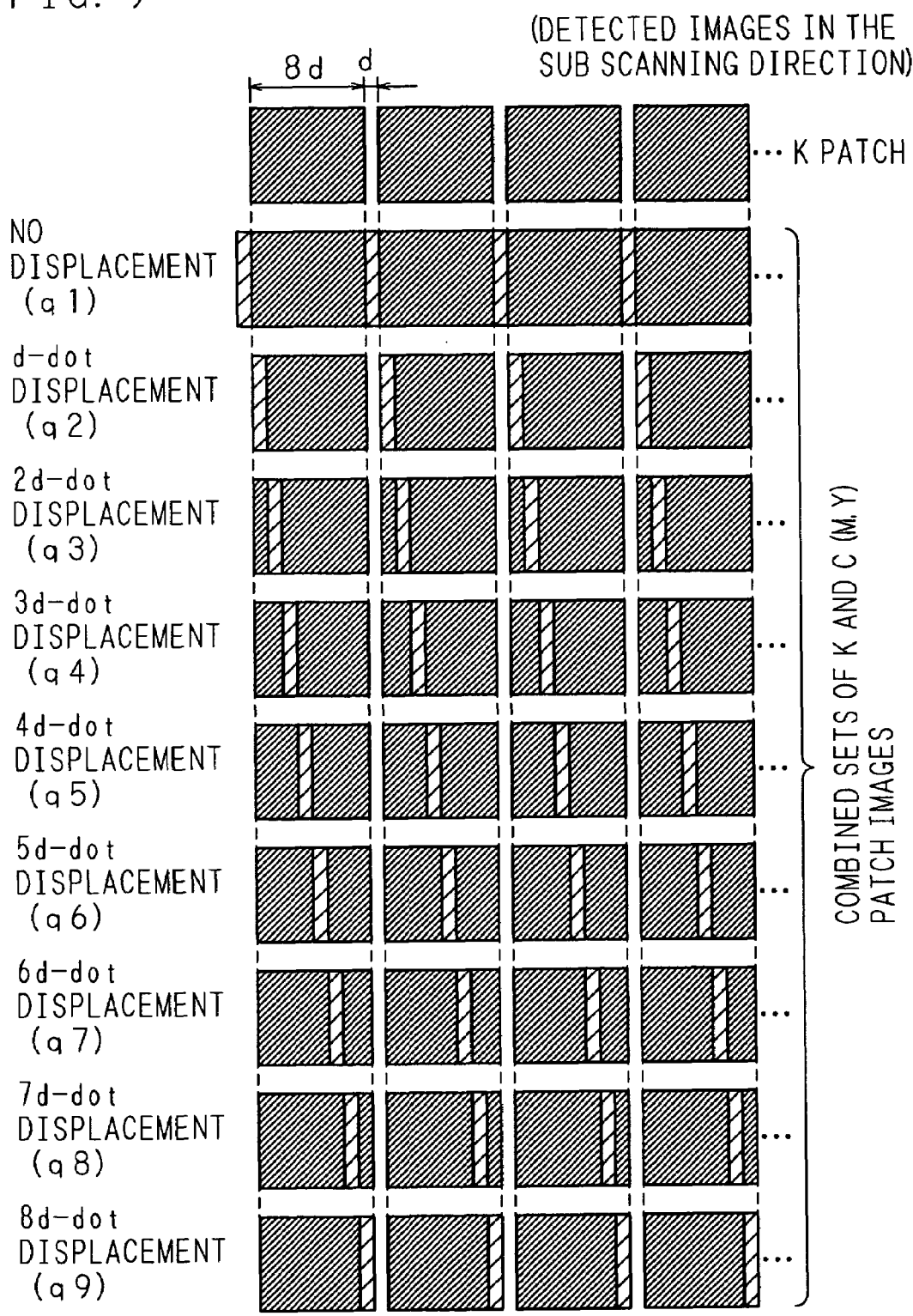
FIG. 9 is an explanatory view showing the base patch images, and the image obtained when the base patch images and the correction patch images are formed.

FIG. 9 is an explanatory view showing the base patch images and the image obtained when the base patch images and the correction patch images are formed. The K patch shows the image of the case where only the base patch images are formed, whereas the rest show the correction patch images superimposing onto the base patch images with the adjustment value changed respectively. Each of correction lines is shifted d dots by d dots from the q1 state to successively move the correction patch images on the base patch images to the q9 state. Shifting of further dots would periodically form the same images as q1-q9 again (not shown). This would exceed the range of color adjustment, and hence the density of image is detected for the nine types of displacement image patterns from q1 to q9.

Since the transfer belt 7 used in the present embodiment is black (not transparent), the value detected by the registration detection sensor 21 becomes smaller as the area covered by the base patch images or the correction patch images is increased. Thus, the detection value in the state where the correction patch images are formed in the spaces between the base patch images as indicated by q1 in FIGS. 8 and 9 is lower than the detection value in the state where the correction patch images are formed on the base patch images as indicated by q2-q9 in FIGS. 8 and 9. In other words, when the forming positions of the base patch images and the correction patch images match with each other, the density output from the registration detection sensor 21 takes the minimum value.

In the second color adjustment, the density is detected by the registration detection sensor 21 for the base patch images and the correction patch images formed on the transfer belt 7. As shown in FIG. 8, the registration detection sensor 21 detects the density of the base patch images and the correction patch images within the sensor readable range D. The sensor readable range D in the present embodiment has the diameter of approximately 10 mm, and is formed to be capable of averaging detection errors caused by color misregistration due to fine (small) vibration or the like. Each of several tens of base patch images and each of several tens of correction patch images form a set of images under one condition, and a plurality of sets of images are formed under various other conditions.

In response to an instruction issued by the CPU 51, the base patch images and correction patch images as shown in FIG. 8 are formed for a certain period of time. The CPU 51 measures the density at the sampling periods of 2 msec and stores the results into the RAM 52. When a predetermined period of time has elapsed, the average value of the stored density is obtained and stored into the RAM 52. Note that, in the present embodiment, sampling of the density data output from the registration detection sensor 21 is performed for a number of times (approximately 130 times) and an average thereof is obtained in order to improve the measurement accuracy. The sampling, however, may be performed only once and the output value thereof may be compared for each adjustment value. As in the process described above, sampling is performed with the adjustment value changed, and the average of density is stored into the RAM 52 by associating it with each adjustment value.

Figure 10:
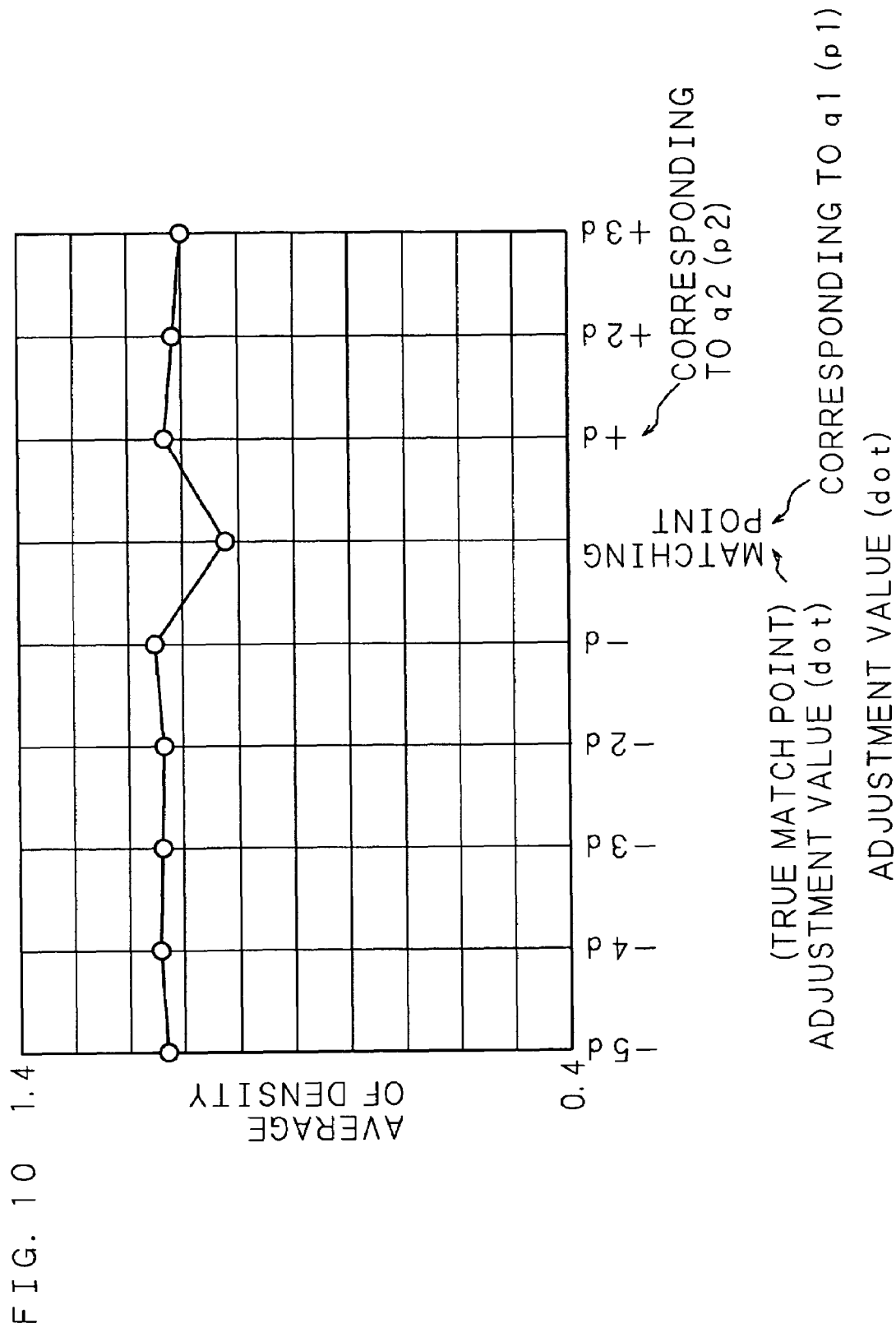
FIG. 10 is a characteristic view showing the transition of the average value of density.

FIG. 10 is a characteristic view showing the transition of the average value of density, illustrating an example plot of the averages of actually-detected output values. In FIG. 10, the vertical axis indicates the average of output values (voltage V) output from the registration detection sensor 21. The horizontal axis indicates adjustment values by the unit of dot. FIG. 10 is a plot of the characteristic change in the average of density obtained by changing the adjustment value for a correction color d dots by d dots. As shown in FIG. 10, the density average takes the minimum value when the position at which a base patch image is formed and the position at which a correction patch image is formed match with each other ("true matching point" in the figure). In FIG. 10, the adjustment value for $-5d$ is "7," the adjustment value for $-4d$ is "18," the adjustment value for $-3d$ is "29," the adjustment value for $-2d$ is "40," the adjustment value for $-d$ is "51," the adjustment value for the matching point is "62," the adjustment value for $+d$ is "73," the adjustment value for $+2d$ is "84," the adjustment value for $+3d$ is "95," and the minimum average can be obtained when the adjustment value is "51." This adjustment value of "51" is the one that can achieve true matching of a base color component image and a color component image to be a subject for adjustment (correction) (the adjustment value corresponding to q1). Accordingly, if the timing of light exposure by the exposure unit 1 performing adjustment (correction) is adjusted such that the average of density output from the registration detection sensor 21 is minimum, the base color component image and the color component image to be a subject for adjustment (correction) are perfectly aligned with each other, allowing formation of a multi-color image without color misregistration.

Thus, in the second color adjustment also, the average of density detected by the registration detection sensor 21 is obtained for every state of alignment of the base patch image and the correction patch image. Then, taking advantage of the fact that the average of density is minimum when no overlapping is seen at the forming positions of the correction patch image and the base patch image, color adjustment is performed by setting the adjustment value for the timing of light exposure by the exposure unit 1 such that the average of density output from the registration detection sensor 21 takes the minimum value.

By performing color adjustment twice as described above, the timing for exposure by the exposure unit 1, i.e. the timing at which a color component image to be a subject for adjustment (correction) is formed such that the base color component image is perfectly aligned with the color component image to be a subject, can be found for adjustment (correction), from the wide range of color adjustment. Moreover, the second color adjustment detects no overlapping state from various other alignment states of the base patch images and the correction patch images having rectangular image forming patterns set based on the first interval obtained as a result of the first color adjustment. Thus, in the first color adjustment, correction values to be obtained are predicted from a narrow range of color adjustment (the range of 11 dots under 11 conditions), whereas, in the second color adjustment, a correction value to be obtained is predicted from the values predicted in the first adjustment, the range of color adjustment here being wide (the range of 99 dots under 9 conditions).

As such, only by forming displaced images of correction patches under 20 conditions, i.e. 20 times (20 types), for comparison with the base patch images and by measuring the density of each set of the images, color adjustment in the wide range of 99 dots can be performed. This allows efficient and easy color adjustment in the wide range and also allows highly accurate color adjustment. Although these color adjustment processes are performed for the image station of each color component that is to be a subject for adjustment (correction), the description here is made only for one color. The color adjustment is performed for each of C, M and Y, with K set as a base.

Although, in the description above, the color adjustment is performed with the line direction of the base patch images and the correction patch images set in the sub scanning direction, the color adjustment is also performed for the base patch images and the correction patch images formed in the main scanning direction (the direction perpendicular to the sub scanning direction) as in the case with the sub scanning direction, since color misregistration also occurs in the main scanning direction.

Figure 11:
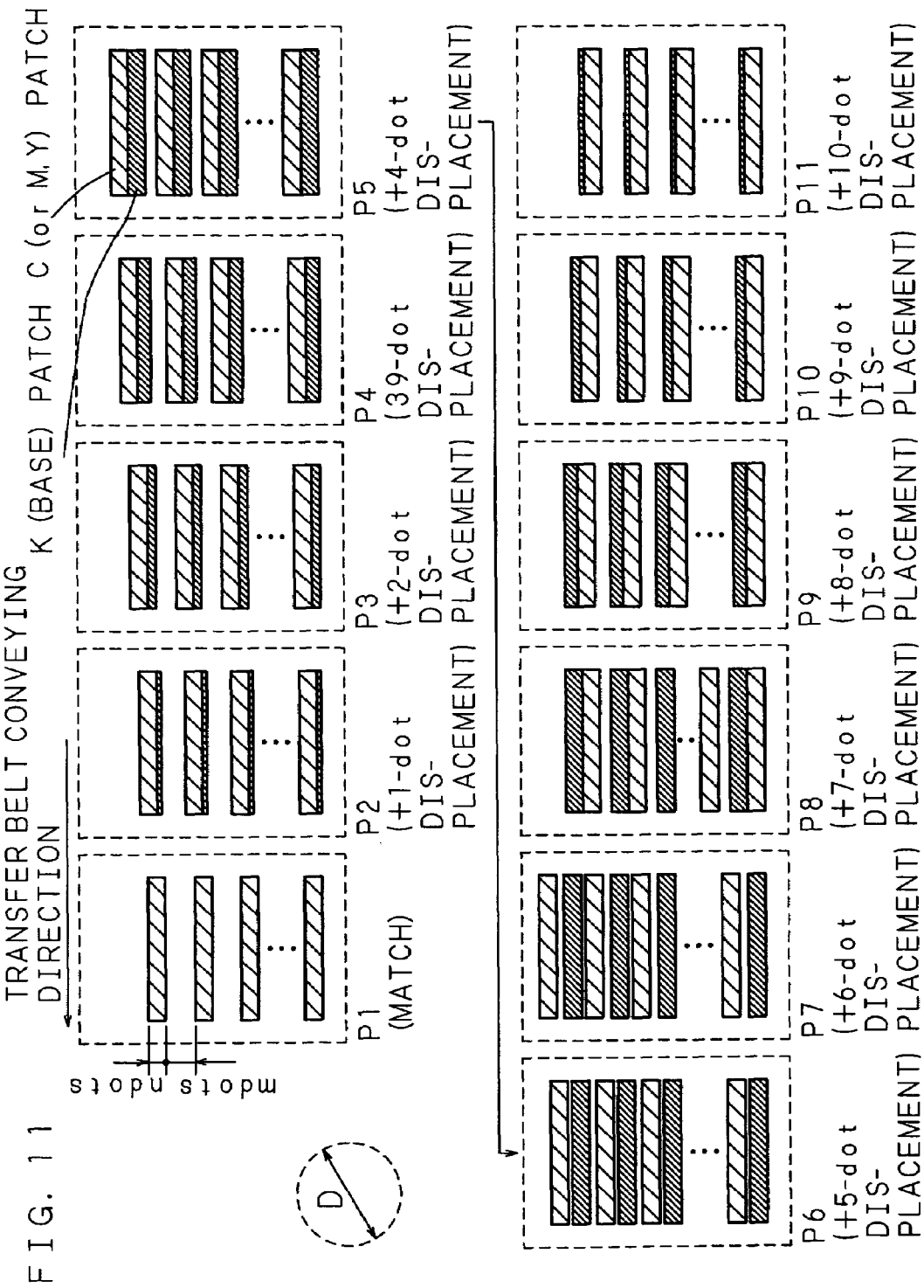
FIG. 11 is an explanatory view showing the images of base lines and correction lines, formed by the first color adjustment, in a main scanning direction.

FIG. 11 is an explanatory view showing the images of base lines and correction lines, formed by the first color adjustment, in the main scanning direction. Here, as shown in FIG. 11, first, as the first color adjustment, correction lines are formed, successively displaced from one another within the range of the pitch for the image forming pattern, and the state where a base patch image is perfectly aligned with a correction patch image is searched for. In this example, P1 of P1 to P11 shows the perfect alignment.

Figure 12:
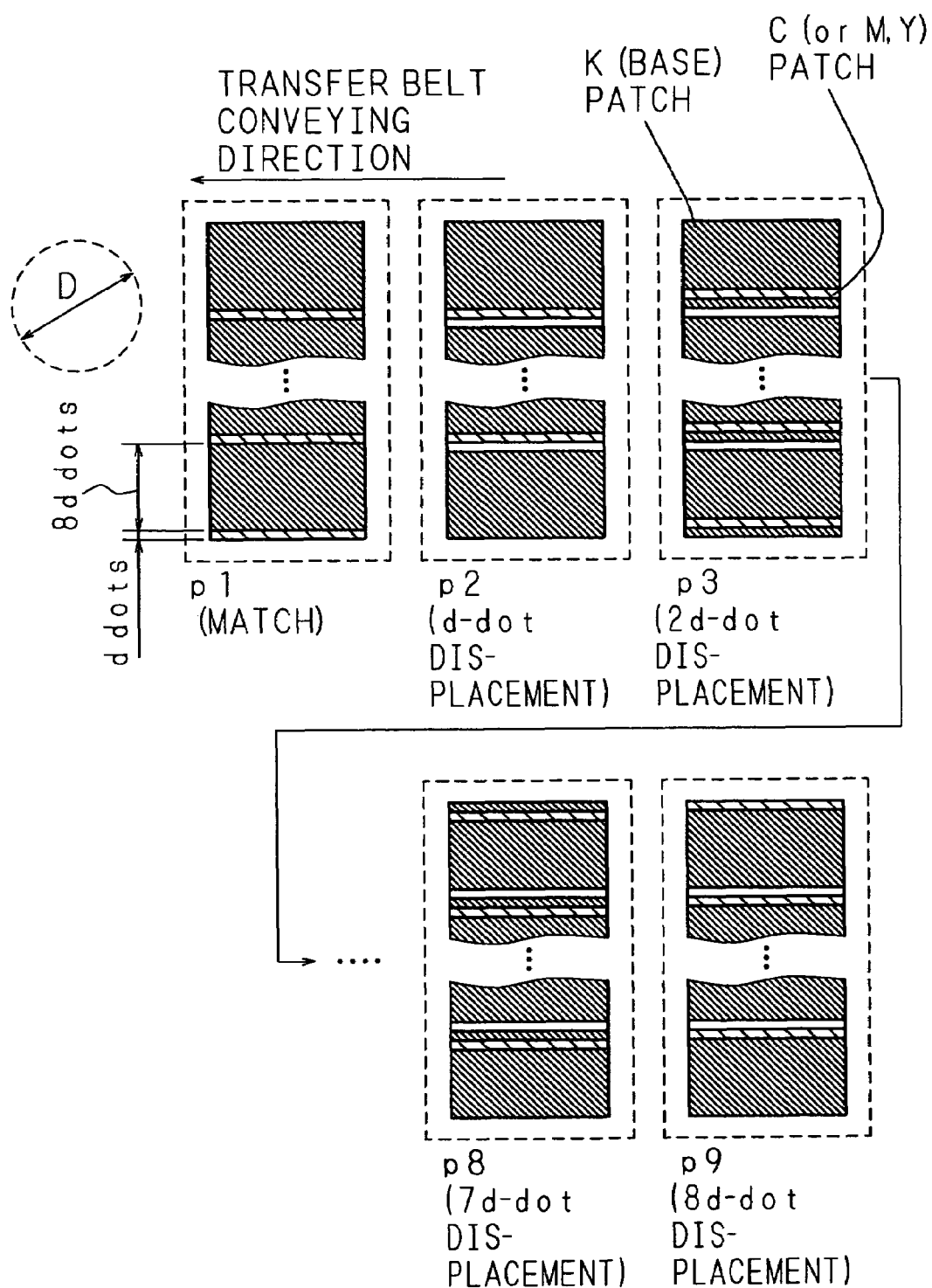
FIG. 12 is an explanatory view showing base patch images and correction patch images, formed by the second color adjustment, in the main scanning direction.

FIG. 12 is an explanatory view showing base patch images and correction patch images, formed by the second color adjustment, in the main scanning direction. As the second color adjustment, each of the correction patch images is displaced by the pitch of the image forming pattern, and the state where no overlapping is seen at the forming positions of a base patch image and a correction patch image is searched for. By such color adjustment, the timing of exposure at which a color component image to be a base and a color component image to be a subject for adjustment (correction) are perfectly aligned with each other in the main scanning direction is obtained and adjustment (correction) is performed.

It is noted that the color adjustment may be performed not necessarily for both the main and sub scanning directions, but for only one of the directions. Accordingly, correction of color misregistration can be performed in one or both of the sub scanning direction and the main scanning direction as required, so that a good image quality can be obtained. Furthermore, the patch image used is not limited to the line pattern as described in the embodiment. A line parallel to the sub scanning direction and a line parallel to the main scanning direction may be formed and the resulting cross-shaped base and correction patch images may be used for color adjustment.

In the structure described above, the procedure of the correction process according to the present invention will be described by flowcharts. It is noted that, as in the description above, the range of color adjustment is set for 99 dots, i.e. from 0 to 99 dots. Moreover, for the first color adjustment, the pitch (the first interval) for the patch images is set as 11 dots, and both the base patch images and the correction patch images are set to have the line width of 4 dots and the line gap of 7 dots. Furthermore, as for the second color adjustment, the pitch for the patch images is set as 99 dots, while the base patch images are set to have the line width of 88 dots and the line gap of 11 dots, and the correction patch images are set to have the line width of 11 dots and the line gap of 88 dots.

Figure 13A:
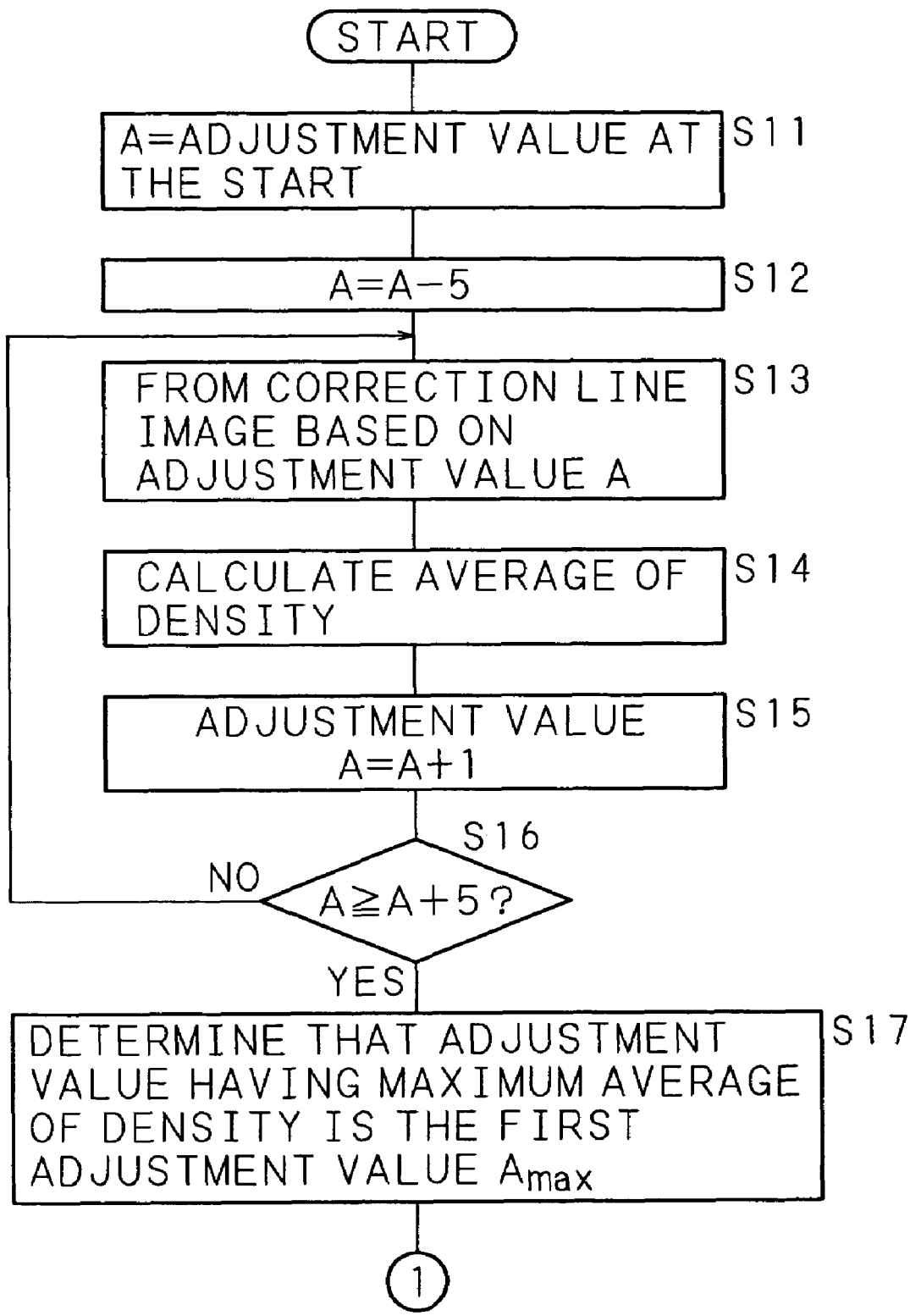
FIGS. 13A and 13B are flowcharts showing the procedure of the correction process according to the present invention.
Figure 13B:
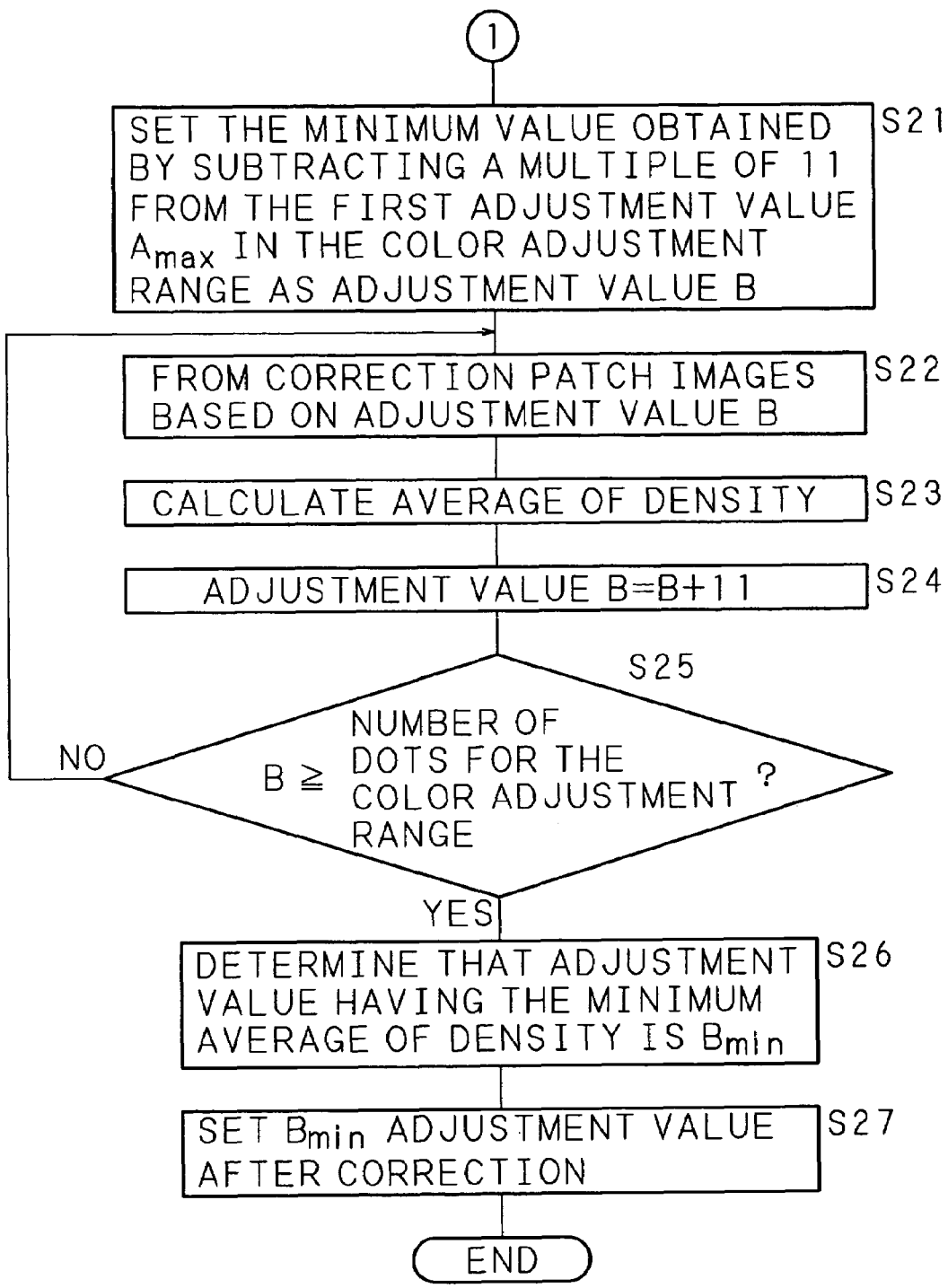

FIGS. 13A and 13B are flowcharts showing the procedure of the correction process according to the present invention. First, the CPU 51 determines an arbitrary position in the range of color adjustment for a correction color as an adjustment value A at the start and stores the value A into the RAM 52 (step S11). In general, if the range of color adjustment is for 99 dots, the median thereof, i.e. A=50, is set as a default adjustment value and stored into the RAM 52. Here, the adjustment value indicates the adjustment value for the timing of exposure by the exposure unit 1 in the image forming station that forms correction patch images.

Subsequently, the CPU 51 performs a process of subtracting 5 from the adjustment value A at the start (step S12). Thus, if the initial value of A is "50," it will be "45." Note that the adjustment value after subtraction is stored into the RAM 52. Next, the CPU 51 refers to the adjustment value table 52T to read out an adjustment value for a base color, and performs light exposure at the timing of exposure based on the adjustment value, to form a base line image for the base color. The CPU 51 also reads out the adjustment value A of "45" that has undergone the subtraction and been stored in the RAM 52, and performs light exposure at the timing of exposure based on the adjustment value A, to form a correction line image for a correction color (step S13). Thus, the correction line is formed at the timing corresponding to −5 dots displaced position from the position where the correction line is formed based on the default adjustment value A (50).

The CPU 51 stores the density signal output from the registration detection sensor 21 into the RAM 52, calculates the average of density after a certain period of time has elapsed (step S14), and stores the calculated value into the RAM 52 by associating it with the adjustment value A. Thereafter, the CPU 51 increments the adjustment value A (step S15). The CPU 51 determines whether or not the adjustment value A after increment is equal to or higher than the value obtained by adding 5 to the initial adjustment value (step S16). Comparison is made to see if the adjustment value A is now (A+5) or "55." At S16, if the adjustment value A is lower than (A+5) (NO at step S16), the process goes back to S13 to repeat S13 to S16 by adding 1 dot by 1 dot to A.

If, on the other hand, the adjustment value A is equal to or higher than (A+5) at S16 (YES at step S16), the adjustment value having the maximum average of density, of the average values of density stored in the RAM 52, is determined as the first adjustment value (step S17). Here, detection of the density of images is performed while forming images with different positions of correction lines dot by dot for eleven times (eleven dots), i.e. from the adjustment values of "45" to "55." If the result of the first color adjustment is as shown in FIG. 7, a matching point (a potential matching point) is $A_{max}$, and the adjustment value A of "46" for the second time is then determined as $A_{max}$.

Subsequently, the second color adjustment process is described. A value obtained by subtracting the maximum multiple of 11 from $A_{max}$ ("46") in the range of color adjustment, which is smaller than the first adjustment value $A_{max}$ determined at step S17, is determined as an adjustment value B. That is, "46"−"44"="2" is set as the initial value for the adjustment value B (step S21). The CPU 51 reads out an adjustment value of the base color from the adjustment value table 52T, and forms an image by performing light exposure on a rectangular base patch image of 88 dots, i.e. an integer multiple of 11 dots (an integer multiple of the first interval), in accordance with the read adjustment value. Note that the pitch (interval) of the base patch images is 99 dots, which is also an integer multiple.

Likewise, the CPU 51 forms a rectangular correction patch image of 11 dots, which is a multiple of 11 dots, at the exposure timing for the adjustment value B (step S22). Note that the pitch of the correction patch images is 88 dots, which is also an integer multiple. The CPU 51 stores the density signal output from the registration detection sensor 21 into the RAM 52, calculates the average of density after a certain period of time has elapsed, and stores the calculated result into the RAM 52 by associating it with the adjustment value B (step S23). Then, the CPU 51 adds the pitch of 11 for the image forming pattern in the first color adjustment to the adjustment value B, and stores the adjustment value B of "13" into the RAM 52 (step S24).

The CPU 51 compares the adjustment value B after addition with the number of dots (99) of the color adjustment range, and determines whether or not the adjustment value B is equal to or higher than the number of dots of the color adjustment range (step S25). If the adjustment value B is lower (NO at step S25), the process goes back to S22 to repeat S22-S25. On the other hand, if the adjustment value B is equal to or higher than the number of dots (99) of the color adjustment range at S25 (YES at step S25), an adjustment vale B having the minimum average of density is obtained from the average of density for each adjustment value B stored at S23, and is set as the second adjustment value $B_{min}$ (step S26).

If the result obtained here is as shown in FIG. 10, the sixth time ("57") corresponds to the minimum value, which is the true matching point. Finally, the CPU 51 stores (sets) the determined second adjustment value into the adjustment value table 52T as the adjustment value after correction (step S27). By performing the process described above for each color and also for the main scanning direction, the color adjustment process can be complete.

The color adjustment here is a technique of adjustment at the initial stage, and is performed after assembly of the image forming apparatus 100, or when installed at a place where the apparatus is actually used, or after replacement of parts or at maintenance. After the color adjustment, the adjustment values above are stored into the adjustment value table 52T in the image forming apparatus 100, and images are formed based on these adjustment values. The color adjustment described above includes the first color adjustment and the second color adjustment. Although, in the present embodiment, an image forming apparatus employs a direct transfer system in which a paper is carried on the transfer belt 7 and toner images formed on the respective photosensitive drums are layered one after another on the paper, the present invention can also be applicable to an image forming apparatus employing an intermediate transfer system in which toner images formed on the respective photosensitive drums are layered and transferred onto a transfer belt and then are collectively transferred again onto a paper to form a multi-color image, which can, needless to say, present a similar effect.

Second Embodiment

While the first color adjustment and the second color adjustment were carried out in the first embodiment, the second embodiment relates to a technique of omitting the second color adjustment as required.

For instance, when the power is input into the image forming apparatus after the initial color adjustment and adjustment is performed before image formation, the second color adjustment may be omitted or may be performed with a narrower range of adjustment, since it is assumed that significant color misalignment hardly occurs in such a case. It may also be possible that only the first color adjustment is performed, and both the first color adjustment and the second color adjustment are carried out when a predetermined period of time has elapsed since the power input or when a predetermined or a larger number of images are formed. Such a structure allows the time required for color adjustment to be significantly shortened by omitting the second color adjustment in usual cases.

Moreover, the second color adjustment may also be performed in addition to the first color adjustment when the temperature or moisture reaches a predetermined value, or when a rapid change in temperature or moisture is detected by the temperature and moisture sensor 22 shown in FIG. 1 that is installed in the image forming apparatus 100. Furthermore, the first and second color adjustment may forcibly be carried out after maintenance, e.g. replacement of a process unit such as a photosensitive drum or a development unit by a maintenance person or a user, or when obvious color misregistration is seen. In such cases, the way of adjustment may be selected from the complete execution of the first and second color adjustment, execution of the combination of the first color adjustment and the second color adjustment with a narrower range, and execution of only the first color adjustment. It is noted that, except for at the time of power input and forcible color adjustment, color adjustment is not carried out immediately when it is determined that a condition of color adjustment as described above is satisfied, but is usually carried out after an image forming job in progress is terminated or before the next job for forming an image is started.

Figure 14A:
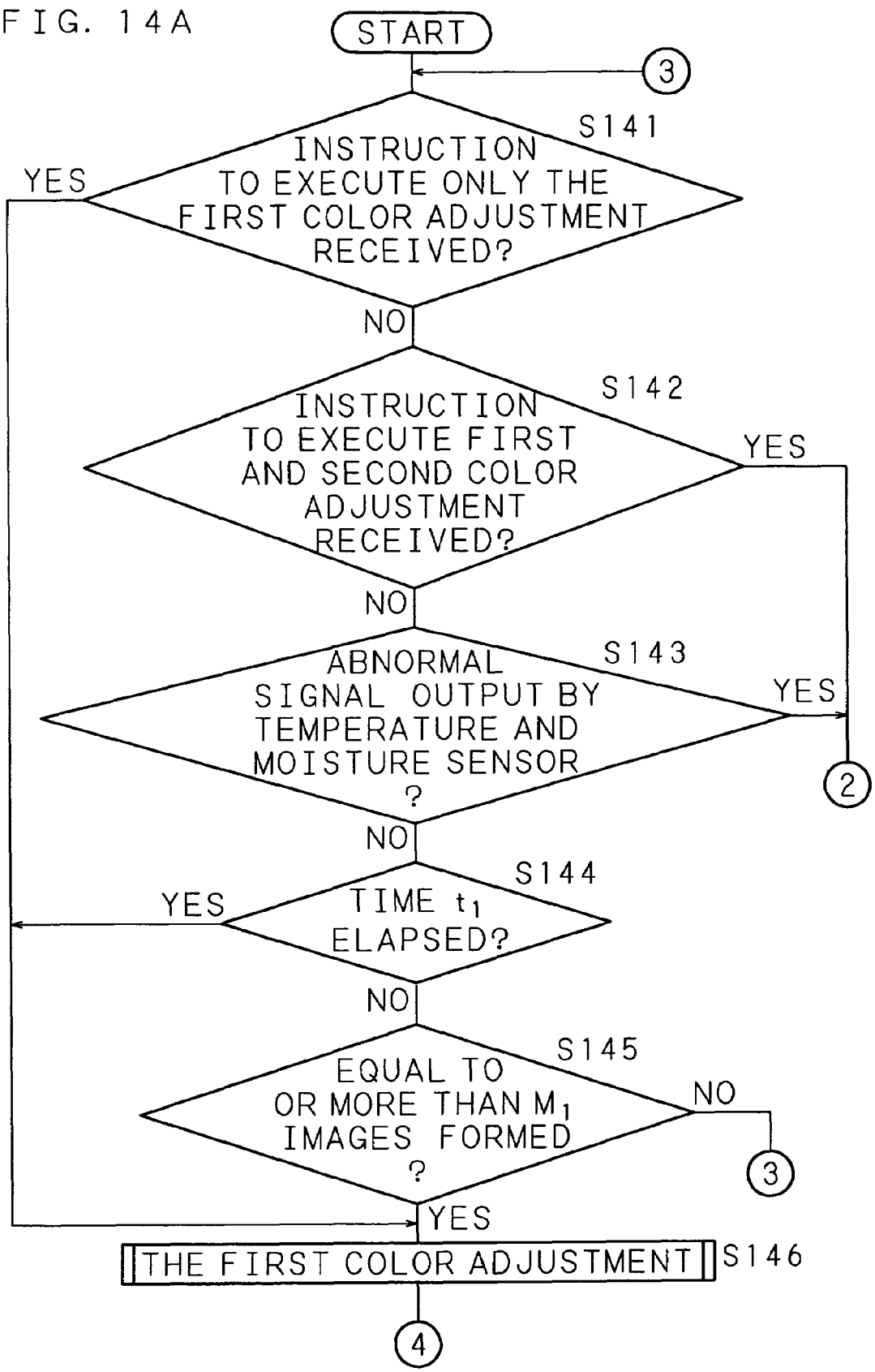

FIGS. 14A and 14B are flowcharts showing the procedure of the correction process according to the second embodiment of the present invention. First, the CPU 51 determines whether or not an instruction to execute only the first color adjustment is received from the operation unit 53 (step S141). A message read from the ROM 55 is displayed on the display unit 54 by menu operation by the operation unit 53, allowing a maintenance person or a user to select either "to perform only the first color adjustment" or "to perform both the first and second color adjustment."

If the instruction to execute only the first color adjustment is received, the process moves on to step S146, performing the first color adjustment as described at steps S11-S17 to determine the first adjustment value (step S146). The subsequent processes will be described later. If, on the other hand, the instruction to execute only the first color adjustment is not received at step S141 (NO at step S141), it is determined whether or not the instruction to execute the first and second color adjustment is received (step S142). If the instruction to execute the first and second color adjustment is received (YES at step S142), the first color adjustment described above is executed (step S150) and the second color adjustment described with reference to S21-S26 are executed so as to determine the second adjustment value (step S151). The processes subsequent thereto will also be described later.

If it is determined that the instruction to execute the first color adjustment and the second color adjustment is not received from the operation unit 53 (NO at step S142), it is determined whether or not an abnormal signal is output from the temperature and moisture sensor 22 to the CPU 51 (step S143). If the abnormal signal is output (YES at step S143), the first color adjustment is executed (step S150) and the second color adjustment is further executed so as to determine the second adjustment value (step S151). If, on the other hand, no abnormal signal is output (NO at step S143), it is determined whether or not the time output from the clock unit 58 indicates that time $t_1$ has elapsed (step S144). If it is determined that the time $t_1$ has elapsed (YES at step S144), the first color adjustment is performed to determine the first adjustment value (step S146). If, on the other hand, it is determined that time $t_1$ has not elapsed (NO at step S144), it is now determined whether or not the number of formed images output from a formed image counter (not shown) is equal to or more than $M_1$ (step S145).

If the number of formed images is less than $M_1$ (NO at step S145), the process moves on to step S141 to repeat the process steps above. If, on the other hand, the number of formed images is equal to or more than $M_1$ (YES at step S145), the first color adjustment process is performed (step S146). Then, it is further determined whether or not the time output from the clock unit 58 indicates that time $t_2$ ($t_2 > t_1$) has elapsed (step S147). If it is determined that the time $t_2$ has elapsed (YES at step S147), the second color adjustment is executed in addition to the first color adjustment of step S146, to determine the second adjustment value (steps S151, S152). If, on the other hand, it is determined that the time $t_2$ has not elapsed (NO at step S147), it is now determined whether or not the number of formed images output from the formed image counter (not shown) is equal to or more than $M_2$ ($M_2 > M_1$) (step S148).

If the number of formed images is less than $M_2$ (NO at step S148), the first adjustment value determined at step S146 is set as a correction value (step S149). Specifically, the CPU 51 renews the contents of the adjustment value table 52T, setting the first adjustment value as the adjustment value corresponding to the exposure unit 1 of a subject for correction. Thereafter, the process goes back to step S141 to repeat the processes above. If, on the other hand, the number of formed images is equal to or more than $M_2$ (YES at step S148), the second color adjustment is performed in addition to the first color adjustment of step S146, to correct the adjustment value to the second adjustment value (steps S151, S152). Specifically, the CPU 51 renews the contents of the adjustment value table 52T, setting the second adjustment value as the adjustment value corresponding to the exposure unit 1 of a subject for correction. It is noted that the time $t_1$ and $t_2$, and the numbers $M_1$ and $M_2$ are stored in the ROM 55 in advance. Moreover, these values may appropriately be changed using the operation unit 53.

Subsequently, the values of t and M are initialized (step S153). Thereafter, it is determined whether or not there is an interrupt process by e.g. forceful termination (step S154). If there is no interrupt process (NO at step S154), the process moves on to step S141 to continue the process. If, on the other hand, there is an interrupt process (YES at step S154), the control program 52P is forcefully terminated, and the series of processes are terminated.

As such, color adjustment to be performed is selectively determined by the instruction from a maintenance person or a user, or under a predetermined condition, whether to execute only the first color adjustment or to execute the first and second color adjustment. Accordingly, the combination of the first and second color adjustment is executed to obtain the second adjustment value if precise color adjustment is required, while only the first color adjustment is executed to obtain the first adjustment value if fine adjustment is performed in a short time. The obtained adjustment values are set as the adjustment values, respectively, for renewing the contents of the adjustment value table 52T.

Figure 15:
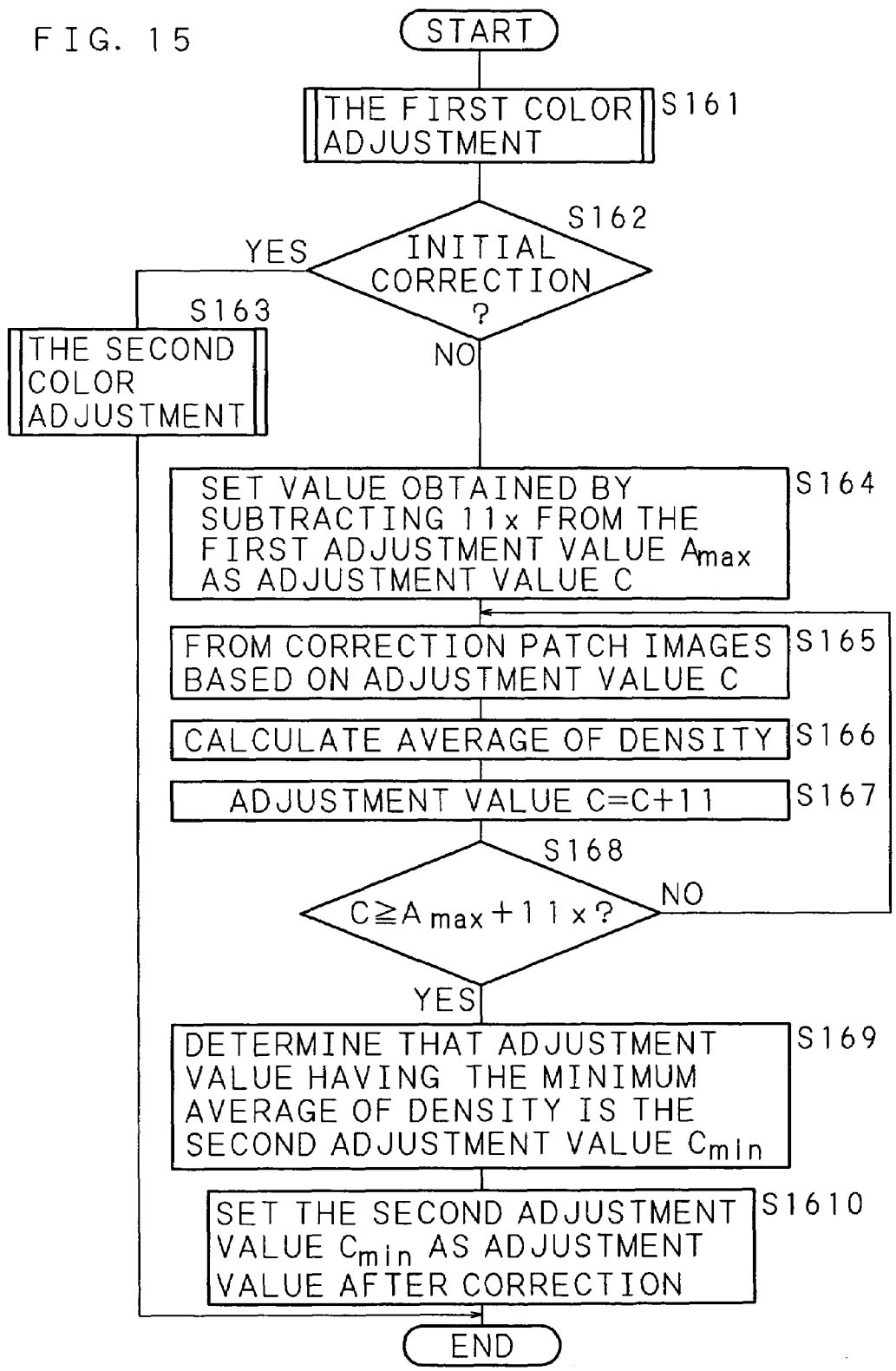
FIG. 15 is a flowchart showing the process procedure of defining the range of the second color adjustment.

Note that the range of color adjustment may be defined as required when the second color adjustment is performed. FIG. 15 is a flowchart showing the process procedure of defining the range of the second color adjustment. First, after the first color adjustment by S11-S17 described above is terminated (step S161), the CPU 51 determines whether or not the color adjustment is the initial correction (completely performing the first color adjustment and second color adjustment) for the cases where the image forming apparatus has just been assembled, or where the apparatus has just been installed in a place of actual use, or where there is a possibility that significant color misregistration occurs after replacement of parts or maintenance (step S162). If it is determined that it is the initial correction at S162 (YES at step S162), the second color adjustment of S21 to S27 as described above is carried out to determine the second adjustment value, which is set as a correction value for renewing the adjustment value table 52T. The process is then terminated.

If, on the other hand, it is determined that it is not the initial correction (completely performing the first color adjustment and the second color adjustment) (NO at step S162), a value obtained by subtracting a predetermined multiple 11× of 11 from $A_{max}$, which is smaller than $A_{max}$ determined at S17, is determined as an adjustment value C ("24" for example, assuming that x is 2) (step S164). That is, "46"–"22"="24" is limitedly set as the initial value for the adjustment value C. The CPU 51 reads out an adjustment value for a base color from the adjustment value table 52T and forms a rectangular base patch image of 88 dots, i.e. an integer multiple of 11 dots (an integer multiple of the first interval), by light exposure in accordance with the read adjustment value. Note that the pitch (interval) for the base patch images is 99 dots, which is also an integer multiple of 11 dots.

Likewise, the CPU 51 forms a rectangular correction patch image of 11 dots, which is a multiple of 11 dots, at the timing of exposure for the adjustment value B (step S165). Note that the pitch for correction patch images is 88 dots, which is also an integer multiple of 11 dots. The CPU 51 stores the density signal output from the registration detection sensor 21 into the RAM 52, calculates the average of density after a certain period of time has elapsed (step S166), and stores the calculated result into the RAM 52 by associating it with the adjustment value C. The CPU 51 then adds the pitch of 11 for the image forming pattern in the first color adjustment to the adjustment value C (step S167) and stores the adjustment value C of "35" into the RAM 52.

The CPU 51 determines whether or not the adjustment value C after addition is equal to or higher than the value obtained by adding a predetermined multiple 11× (68) of "24" above to $A_{max}$ (step S168). If the adjustment value C is lower (NO at step S168), the process goes back to S165 to repeat S165 to S167. If, on the other hand, the adjustment value C is equal to or higher than the value obtained by adding the predetermined multiple 11× (68) of 24 above to $A_{max}$ (YES at step S168), an adjustment value C having the minimum value of the average values of density for all the adjustment value C calculated and stored at S166 is obtained and set as the second adjustment value $C_{min}$ (step S169). Finally, the CPU 51 stores (sets) the determined second adjustment value $C_{min}$ into the adjustment value table 52T as an adjustment value after correction (step S1610).

The structure as described above is employed in the second embodiment. Since the structure and function other than the ones described above are similar to those described in the first embodiment, corresponding portions are denoted by the same reference numbers while the detailed description thereof will not be repeated.

Third Embodiment

Figure 16:
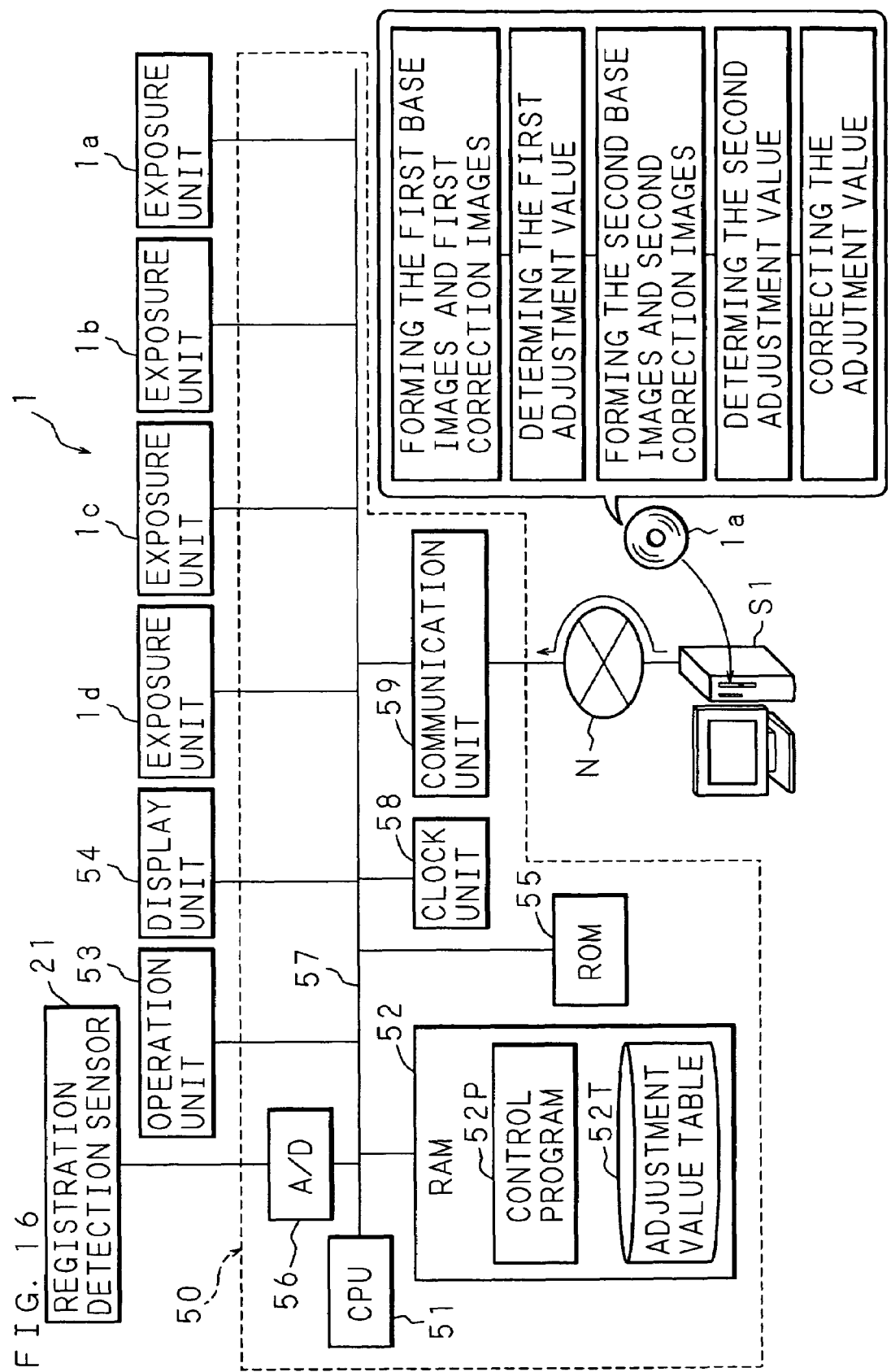
FIG. 16 is a block diagram showing the hardware configuration of a control portion according to the third embodiment.

FIG. 16 is a block diagram showing the hardware configuration of the control portion 50 according to the third embodiment. The computer program for execution of the color adjustment process by the image forming apparatus 100 according to the first embodiment may be provided by downloading a computer program installed in a personal computer S1 connected via a communication unit 59 and LAN (Local Area Network) or a communication network N such as the Internet, as in the third embodiment. Details thereof will be described below.

A recording medium 1a (CD-ROM, MO, DVD-ROM or the like) recording a program for making the control portion 50 of the image forming apparatus 100 shown in FIG. 16 form the first base images and the first correction images, calculate the first adjustment value, form the second base images and the second correction images, determine the second adjustment value, and correct a adjustment value is installed in a hard disk (not shown) in a personal computer S1. Thus provided computer program in the recording medium 1a is transmitted to the control portion 50 of the image forming apparatus 100. The control portion 50 of the image forming apparatus 100 loads the transmitted computer program onto the RAM 52 for execution of the correction process described above. This can realize the correction process of the present invention as described above with the image forming apparatus 100.

The structure as described above is employed in the third embodiment. Since the structure and function other than the ones described above are similar to those described in the first embodiment, corresponding portions are denoted by the same reference numbers while the detailed description thereof will not be repeated.

Fourth Embodiment

Although the first adjustment value is determined by selecting one from the changed adjustment values when the density output from the registration detection sensor 21 takes the maximum value in the first and second embodiments, the first adjustment value may be determined based on the minimum value. Moreover, in order to prevent an error in determination of an adjustment value due to, for example, scattering of a developing agent at development of a latent image, the first correction images, the first base images, the second correction images and the second base images may be made to have the line widths and line gaps specified in the following description. Details thereof will be described below.

Figure 17:
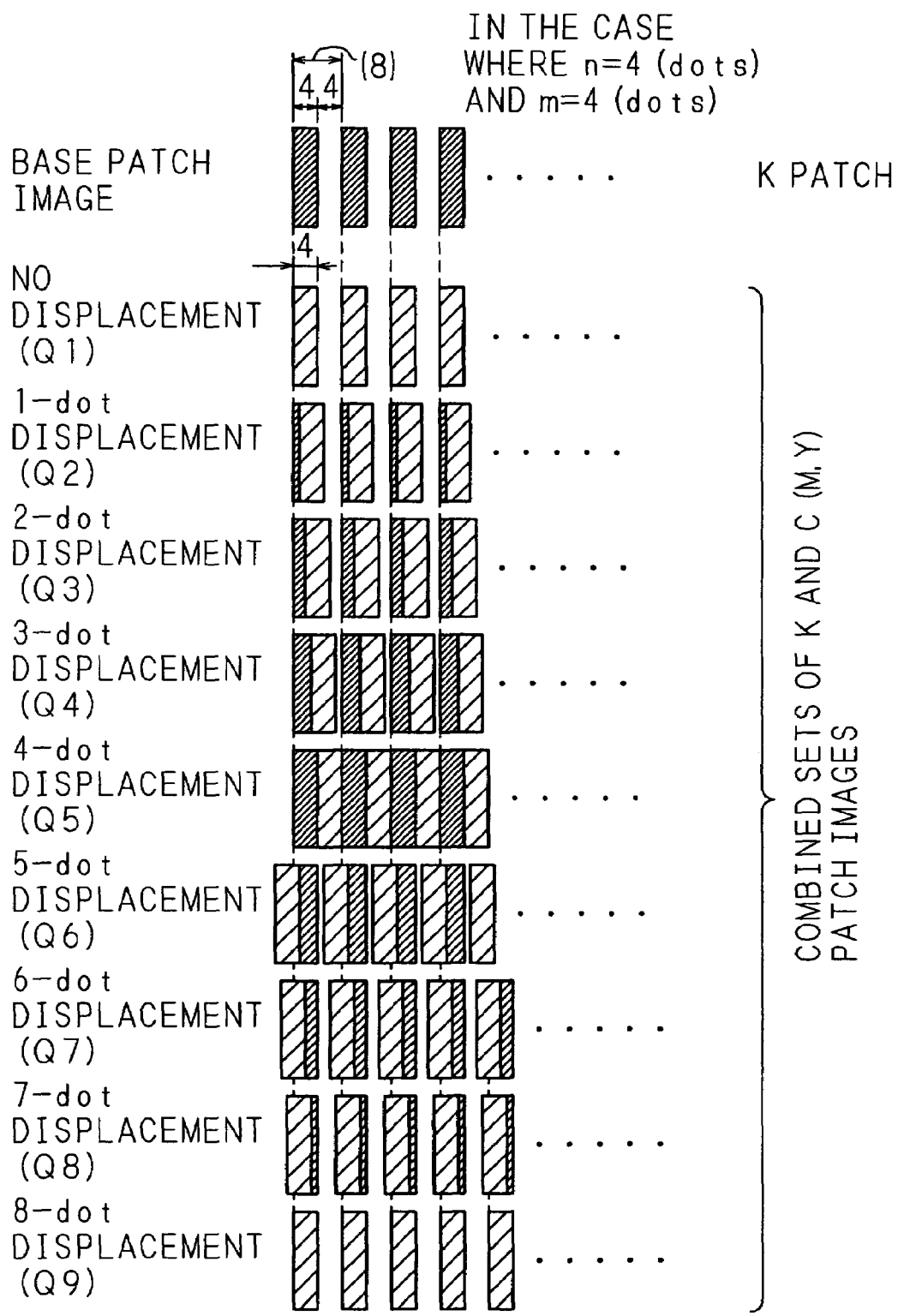
FIG. 17 is an explanatory view showing patch images formed in the sub scanning direction.

FIG. 17 is an explanatory view showing patch images formed in the sub scanning direction. As illustrated, in the first color adjustment, base patch images (base lines) are formed on the transfer belt 7 with the pitch (the first interval (n+m)) for the image forming pattern set as 8 dots consisting of the line width n of 4 dots and the line gap (the gap between lines) m of 4 dots (K patch in FIG. 17). Then, after the base lines are formed, correction patch images (correction lines) each having the same line width n and line gap m as those of the base lines are further formed on the base lines. The density of the base lines and the correction lines formed on the transfer belt 7 are detected by the registration detection sensor 21.

Figure 18:
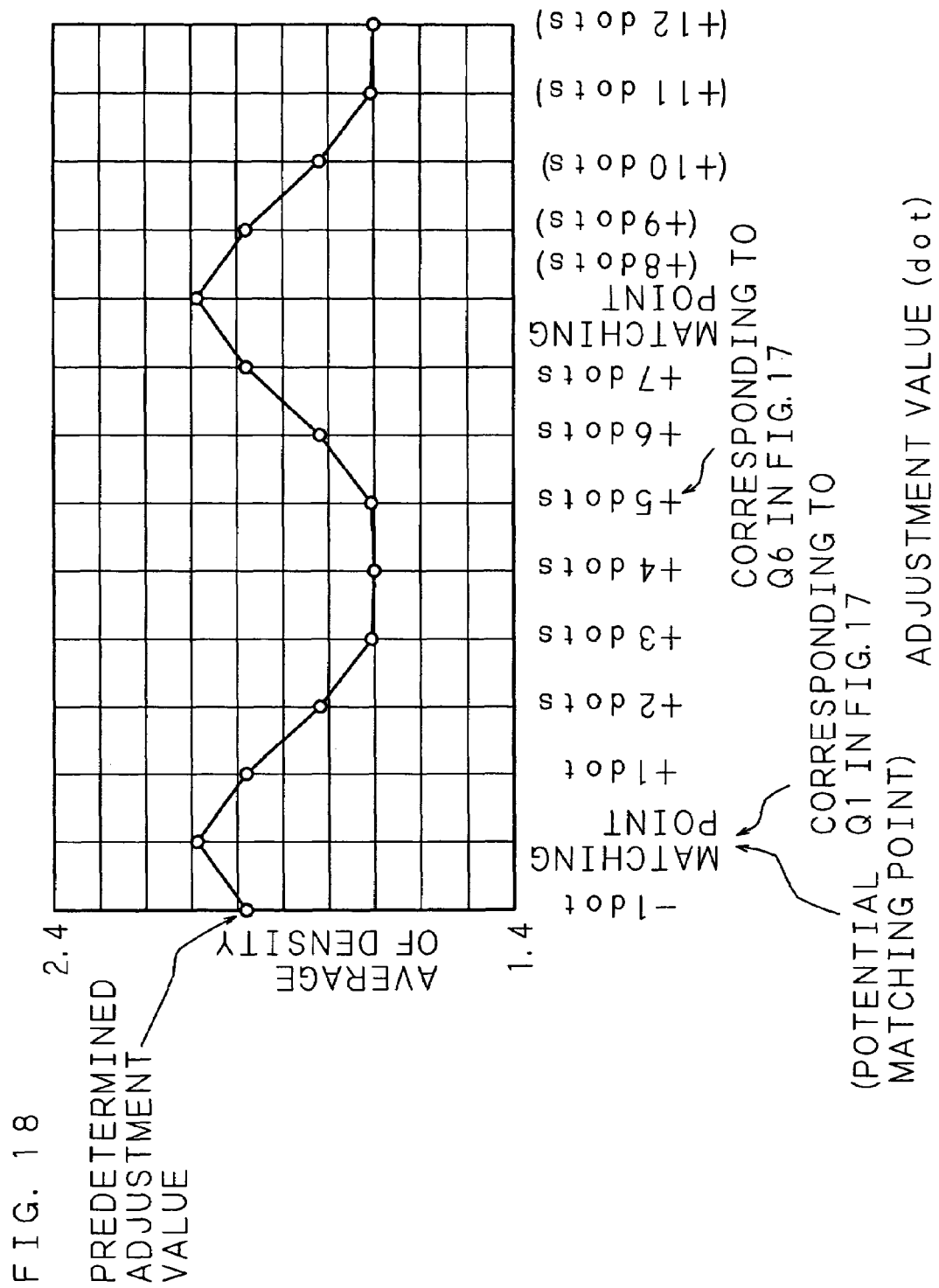
FIG. 18 is a characteristic view showing the transition of the average value of density.

FIG. 18 is a characteristic view showing the transition of the average value of density, illustrating an example plot of the average values of actually-detected output values. In FIG. 18, the vertical axis indicates the average of the values (voltage V) output from the registration detection sensor 21. The horizontal axis indicates the adjustment value by the unit of dot. FIG. 18 is a plot of the characteristic change in the average of density obtained when the adjustment value for a correction color is changed by a predetermined pitch (the first interval of 8 dots), with a predetermined adjustment value of the correction color set as a base. When a base line and a correction line are perfectly aligned with each other ("potential matching point" in FIG. 18), the average of density reaches the maximum. (Since the initial state is −1 dot displaced in this example, the base line and the correction line are potentially aligned with each other when displaced by one dot.)

If the adjustment value is further changed, the characteristic periodically changes, additionally taking an extreme value at every +8 dot-displaced position. Looking at +3 dots to +5 dots in the vicinity of the minimum value in FIG. 18, almost the same average of density is obtained there. This is because the actual images are often formed larger than original image data due to e.g. scattering of a developing agent at the time of development of the formed latent images, especially in image formation by an electrophotographic system. It is assumed that the gap between one first base image and the next first base image is made to have the same width as that of the first correction image. If n=4 dots and m=4 dots for example as shown in FIG. 17, a gap of 1 dot is formed on the image data at 3 dot-displaced (Q4) and 5 dot-displaced (Q6) positions, and the output value of density should take the minimum value at the 4 dot-displaced position (Q5).

Figure 19A:
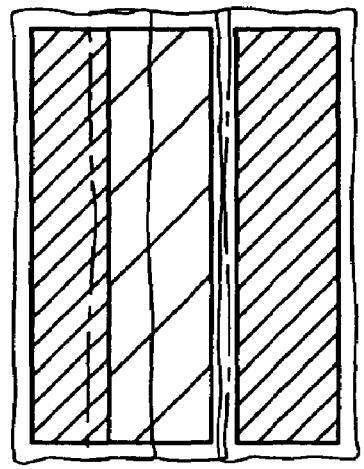
FIGS. 19A to 19C are enlarged views of an image forming portion.
Figure 19B:
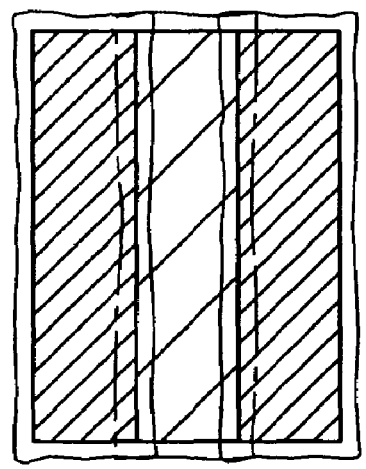
Figure 19C:
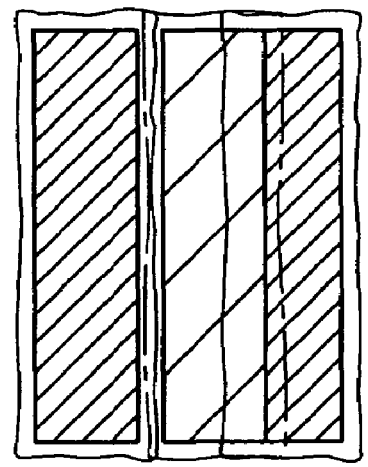

FIGS. 19A to 19C are enlarged views of the image forming portion. As illustrated, the images of the rectangular correction lines and base lines are formed off the designated lines due to scattering of a developing agent. FIG. 19B is an enlarged view showing the case where the minimum value of density is obtained while no gap is formed, whereas each of FIGS. 19A and 19C is an enlarged view showing the case where a gap of 1 dot is present between a base line and a correction line. The developing agent scattering at image formation may be diffused into this gap, which may result that, as shown in each of FIGS. 19A and 19C, the output of the registration detection sensor 21 takes almost the same value as that of the 4 dot-displaced image (Q5) (FIG. 19B).

It is, therefore, preferable to use the maximum value in determination of the first adjustment value if n=4 and m=4. Note that the range correctable by the first adjustment value alone is narrowed to 8 dots in such a case, which however allows reduction of the number of times the first images (the first base image and the first correction image) are formed, and hence allows shortening of adjustment time.

Figure 20:
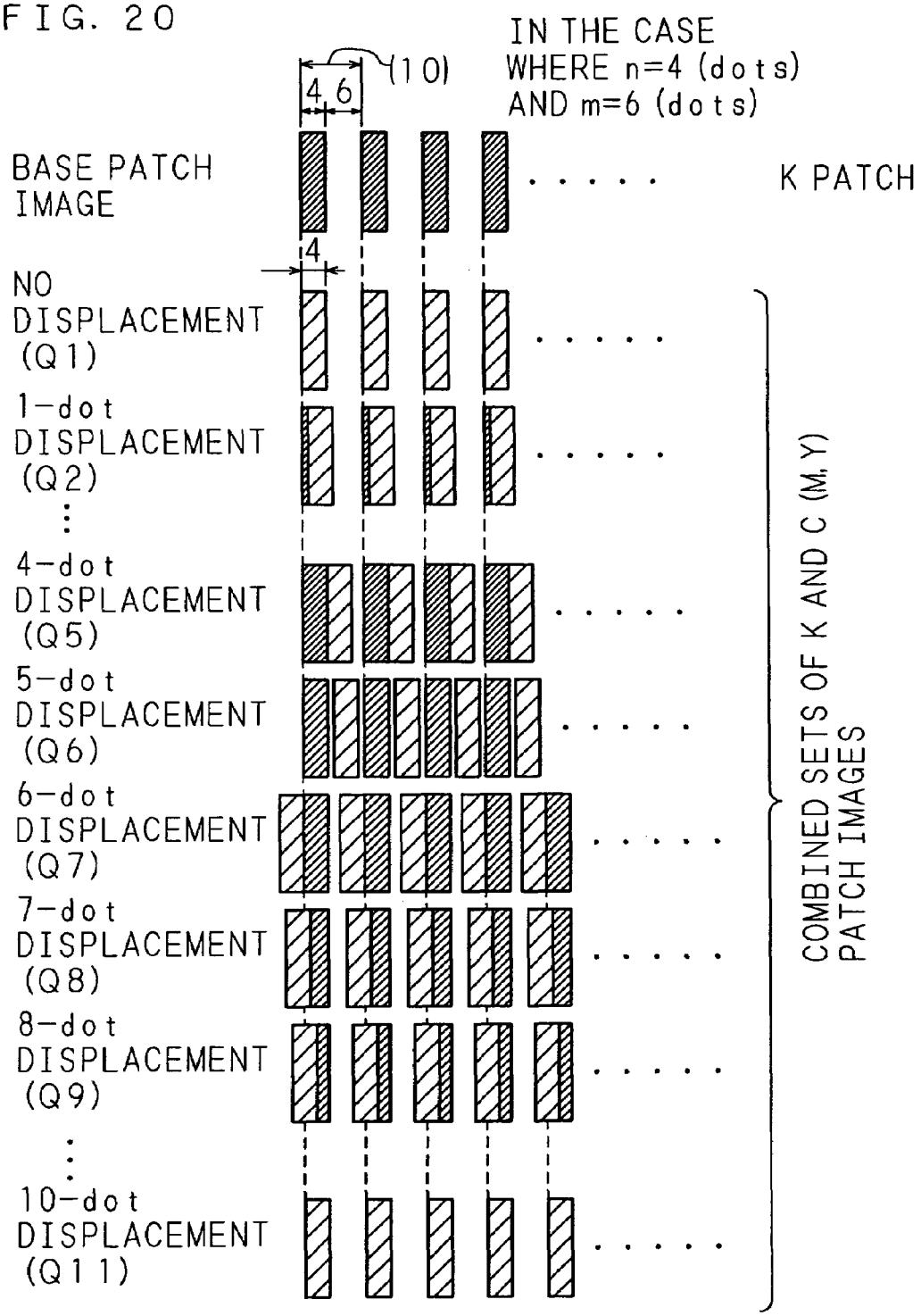
FIG. 20 is an explanatory view showing patch images formed in the sub scanning direction.

FIG. 20 is an explanatory view showing patch images formed in the sub scanning direction. As illustrated, in the first color adjustment, base patch images (base lines) are formed on the transfer belt 7 with the pitch (the first interval (n+m)) of the image forming pattern set as 10 dots consisting of the line width n of 4 dots and the line gap (the gap between the lines) m of 6 dots (K patch in FIG. 20). Then, after the base lines are formed, correction patch images (correction lines) are further formed on the base lines, having the same line width n and the line gap m as those of the base lines. The density of the base lines and the correction lines formed on the transfer belt 7 are detected by the registration detection sensor 21.

Figure 21:
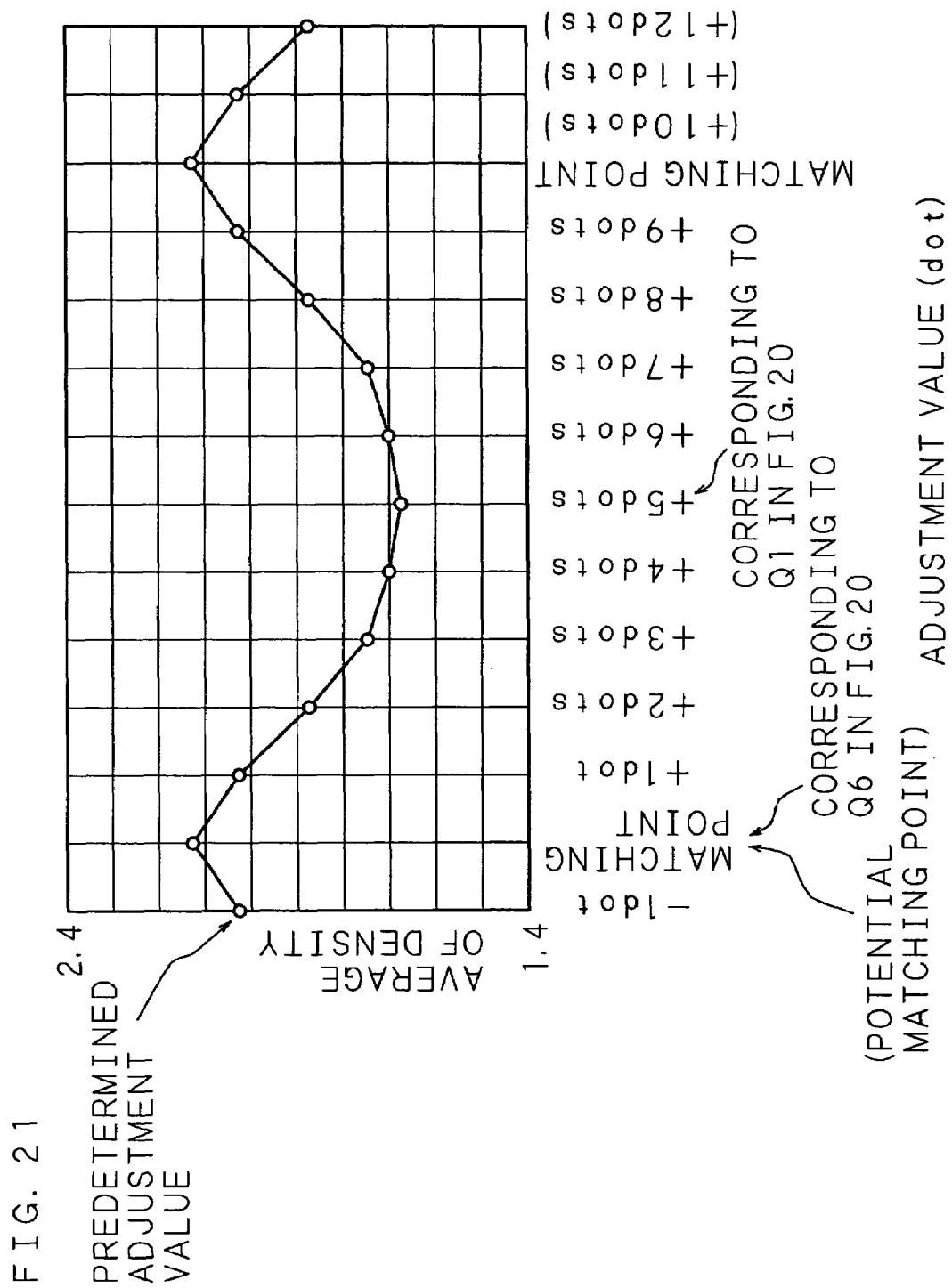
FIG. 21 is a characteristic view showing the transition of the average value of density.

FIG. 21 is a characteristic view showing the transition of the average value of density, illustrating an example plot of the average values of the actually-detected output values. In FIG. 21, the vertical axis indicates the average of the values (voltage V) output from the registration detection sensor 21. The horizontal axis indicates the adjustment value by the unit of dot. FIG. 21 is a plot of the characteristic change in the average of density obtained when the adjustment value for a correction color is changed by a predetermined pitch (the first interval of 10 dots), setting a predetermined adjustment value of the correction color as a base point. When a base line and a correction line are perfectly aligned with each other ("potential matching point" in FIG. 21), the average of density reaches the maximum. Moreover, the average of density takes the minimum value at the point of +5 dots. Compared with the example shown in FIG. 18, it is easier to detect the minimum value. The reason for this will be described with reference to FIGS. 22A to 22C.

Figure 22A:
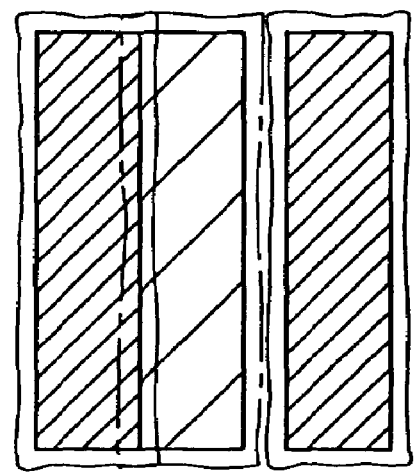
FIGS. 22A to 22C are enlarged views of the image forming portion.
Figure 22B:
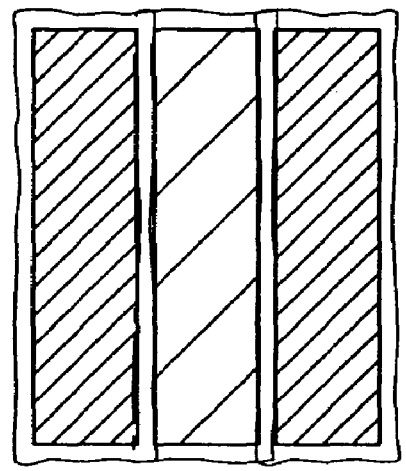
Figure 22C:
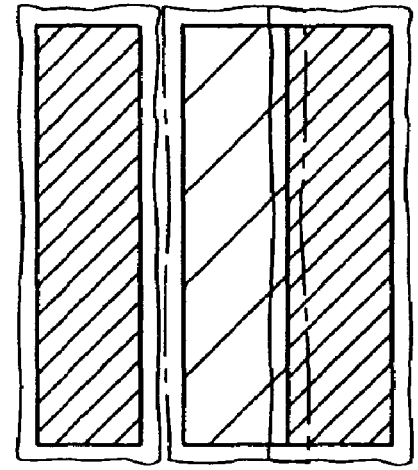

FIGS. 22A to 22C are enlarged views of the image forming portion. As shown in FIGS. 22A and 22C, a gap is formed at one of the spaces, in the illustrated example, formed between the correction lines and base lines in the case of 4-dot displacement (Q5) and 6-dot displacement (Q7). By contrast, as shown in FIG. 22B, a gap is formed at every space between each correction line and each base line in the case of 5-dot displacement (Q6). Though the images are expanded due to e.g. scattering of a developing agent in FIG. 22B also, the minimum value can significantly be obtained compared with the cases in FIGS. 19A to 19C because of the large size of a gap.

Accordingly, if the minimum value is used, a plurality of first base images and first correction images are formed with the base line width and the correction line width of 4 dots and the first interval of 10 dots (n=4, m=6), the interval being longer than twice the length of the short side (4 dots) of each of the first base images or the first correction images having the same rectangular shape. Such a structure allows detection of one minimum value and thus accurate determination of the first adjustment value even in the circumstances where the minimum value cannot easily be detected due to scattering of a developing agent. This narrows the range correctable by the first adjustment value alone to 10 dots, which however can significantly reduce the number of times the first images (the first base image and the first correction image) are formed, allowing substantial shortening of time required for the adjustment for obtaining the first adjustment value. Moreover, in such a case, the process of adding or subtracting a value of a predetermined number of dots (5 dots) to/from the obtained adjustment value is performed to determine the first adjustment value. For instance, in FIG. 21, if the minimum value is taken at +5 dots (adjustment value of 60), the first adjustment value (adjustment value of 55 or 65) can be obtained by adding or subtracting the value of the first interval (10 dots) divided by 2 to/from the adjustment value (60) having the minimum value.

It is noted that there are different methods of detecting the positional relationship between the first base image and the first correction image for color adjustment; one method of obtaining an adjustment value for the case where the first base image and the first correction image are completely aligned with each other, i.e. a detection method based on the maximum value, and the other method of obtaining an adjustment value for the case where the first correction image is completely displaced from the first base image, i.e. a detection method based on the minimum value. Which method should be used may be determined in consideration of the characteristic and the like of image formation in the image forming apparatus. Moreover, the numbers applied to n and m may be set in consideration of the range correctable by the first adjustment value alone and the time required for the adjustment, and the output voltage at density measurement by the registration detection sensor 21. It is needless to say that those numbers are not limited to the ones described.

Furthermore, in the present invention, the second base images and the second correction images are formed based on the image width n and the first interval n+m for the first images. If n=4 and m=7 as in the example above, the second base images are formed, each having the width of an integer multiple (88 bits for example) of the first interval, with the interval of also an integer multiple (every 99 dots; an image is formed for 88 dots while no image is formed for 11 dots). By contrast, the second correction images are formed, each having the width of an integer multiple (11 dots for example) of the first interval, with the interval of also an integer multiple (every 99 dots; an image is formed only for 11 dots while no image is formed for 88 dots). These images are formed for each of the adjustment values specified by the first adjustment value and the first interval. In the example above, the second base images and the second correction images are formed based on the first interval by displacing the adjustment value by every 11 dots starting from the determined first adjustment value. That is, the correction images each having the width of 11 dots are formed at every 11 dots.

Then, the image formed based on the adjustment value obtained at perfect matching, of a plurality of adjustment values specified by the first adjustment value, is completely covered by the base color and the correction color, taking an extreme value, so that the second adjustment value is determined. The second adjustment value is then set as the adjustment value after correction. Specifically, if the color adjustment is perfectly achieved when the images of the correction color having the 11-dot width are formed at every 11 dots, the gap having no base color image is filled with the 11 dots of the correction color. Here, the density has an extreme value, so that this adjustment value is the true adjustment value. As such, the second base images and the second correction images are layered based on the first interval used for forming the first base images, allowing correction with higher accuracy. Moreover, the density is detected only for the adjustment values specified by the first adjustment value and the first interval, also allowing correction in a shorter time. In such a case, the total range of adjustment corresponds to 99 dots. Note that, as for the extreme values, though the minimum value of the average of density is set as the second adjustment value as shown in FIG. 10, the maximum value which is also an extreme value may be determined as the second adjustment value in such a case that the contrast is inverted due to, for example, the color of the transfer belt.

In addition, if n=4 and m=4 as in the example described above, the second base images are formed, each having the width corresponding to an integer multiple (88 dots for example) of the first interval, with the interval of also an integer multiple (every 96 dots; an image is formed for 88 dots while no image is formed for 8 dots). By contrast, the second correction images are formed, each having the width corresponding to an integer multiple (8 dots for example) of the first interval, with the interval of also an integer multiple (every 96 dots; an image is formed only for 8 dots while no image is formed for 88 dots). The images are thus formed for each of the adjustment values specified by the first adjustment value and the first interval. In the example above, the second base images and the second correction images are formed based on the first interval by shifting the adjustment values by every 8 dots starting from the determined first adjustment value. That is, the correction images, each having the width of 8 dots, are formed at every 8 dots.

Then, the image formed based on the adjustment value that shows the perfect match, of the plurality of adjustment values specified by the first adjustment values, is completely covered by the base color and the correction color, taking an extreme, so that the second adjustment value is determined. This second adjustment value is then set as the adjustment value after correction. Specifically, in the case where the images of the correction color having the width of 8 dots are formed with displacement at every 8 dots, if the color adjustment is completely achieved, the gap of 8 dots in which no image of the base color is formed is filled with the correction color of 8 dots. In this case, the density also has an extreme value, so that the adjustment value obtained here is the true adjustment value. As such, the second base images and the second correction images are formed by layering based on the first interval used for forming the first base images, allowing correction with higher accuracy. Moreover, the density is detected only for the adjustment values specified by the first adjustment value and the first interval, also allowing correction in a shorter time. In such a case, the total range of adjustment corresponds to 96 dots.

In addition, if n=4 and m=6 as in the example described above, the second base images are formed, each having the width corresponding to an integer multiple (90 dots for example) of the first interval (10 dots), with the interval of also an integer multiple (every 100 dots; an image is formed for 90 dots while no image is formed for 10 dots). By contrast, the second correction images are formed, each having the width corresponding to an integer multiple (10 dots for example) of the first interval, with the interval of also an integer multiple (every 100 dots; an image is formed only for 10 dots while no image is formed for 90 dots). The images are thus formed for each of the adjustment values specified by the first adjustment value and the first interval.

In the example above, the second base images and the second correction images are formed based on the first interval by shifting the adjustment value by every 10 dots starting from the determined first adjustment value. That is, the correction images, each having the width of 10 dots, are formed at every 10 dots.

Then, the image formed based on the adjustment value that shows the perfect match, of the plurality of adjustment values specified by the first adjustment value, is completely covered by the base color and the correction color, taking an extreme, so that the second adjustment value is determined. This second adjustment value is then determined as the adjustment value after correction. Specifically, in the case where the images of the correction color having the width of 10 dots are formed at every 10 dots, if the color adjustment is completely achieved, the gap of 10 dots in which no image of the base color is formed is filled with the correction color of 10 dots. In this case, the density also has an extreme value, so that the adjustment value obtained here is the true adjustment value. As such, the second base images and the second correction images are formed by layering based on the first interval used for forming the first base images, allowing correction with higher accuracy. Moreover, the density is detected only for the adjustment values specified by the first adjustment value and the first interval, also allowing correction in a shorter time. In such a case, the total range of adjustment corresponds to 100 dots.

In the image formation for determining the first adjustment value, if n=4 and m=7, the first correction images are formed, displaced from the first base image dot by dot from 0 to 10 dots. Since displacement of 11 dots would be the same as displacement of 0 dots, the image formation and density measurement are terminated when the displacement goes through 0 to 10 dots. Likewise, if n=m=4, the first correction image is formed, displaced from the first base image dot by dot from 0 to 7 dots. Since displacement of 8 dots would be the same as displacement of 0 dots, the image formation and density measurement are terminated when the displacement goes through 0 to 7 dots. Similarly, if n=4 and m=6, the first correction images are formed, displaced from the first base image dot by dot from 0 to 9 dots. Since displacement of 10 dots would be the same as displacement of 0 dots, the image formation and density measurement are terminated when the displacement goes through 0 to 9 dots.

The range of displacement for the correction image from the base image in image formation for determining the first adjustment value and the second adjustment value is set as follows. If the first adjustment value is to be determined, the stored default first adjustment value or the first adjustment value obtained and stored in advance is set as a base, and the range of displacement is determined such that the amount of displacement is the same before and after the base. As for the second adjustment value, the correction images are formed by shifting the obtained first adjustment value in the adjustable range that has been set. Note that, though determination of the adjustment value is described for the sub scanning direction here, the same can apply to the main scanning direction, the description of which will not be repeated. In addition, the range of displacement of the images formed at determination of the first adjustment value is set to n+m dots or smaller, since the same state of images are repeated even if the range is made larger than n+m dots. FIGS. 7, 18 and 21 represent the cases where images are successively formed with the amount of displacement incremented to illustrate that the same curves would repeatedly be obtained. In practice, image formation is performed within the range of displacement of n+m dots.

The structure as described above is employed in the fourth embodiment. Since the structure and function other than the ones described above are similar to those described in the first embodiment, corresponding portions are denoted by the same reference numbers while the detailed description thereof will not be repeated.

As has been described in detail, in the present invention, fine adjustment of adjustment values is performed only in a predetermined area of all the adjustment areas to determine candidates for the adjustment values and sampling is performed only for the candidate adjustment values in all the adjustment areas to determine a final adjustment value, allowing correction of color misregistration in a shorter time and with higher accuracy, compared to the conventional method of performing sampling for all the adjustment areas one after another.

Moreover, in the present invention, the first base images are formed with the first interval, while the first correction images are formed with the adjustment value changed in the range of the first interval. Then, the change in the density output from the sensor will be such that the data having extreme values at positions with no displacement are repeatedly obtained at such intervals (cycles). With such a structure, the adjustment value to be corrected can more efficiently be determined, allowing color adjustment in a short time as a result.

Furthermore, in the present invention, the first base images and the first correction images are formed to have the same shape. Thus, an extreme value of density output from the sensor shows a significant peak when the first base image and the first correction image are perfectly matched with each other, allowing determination of the adjustment value with higher accuracy.

Additionally, in the present invention, the second base images and the second correction images are formed based on the first interval. The second correction images are formed, each having the width corresponding to an integer multiple of the first interval, with the interval of also an integer multiple. The image formation is performed for every adjustment value specified based on the first adjustment value and the first interval. Then, an image that is formed based on the adjustment value corresponding to the perfect match, of the plurality of adjustment values specified based on the first adjustment value, is completely covered by the base color and the correction color, taking an extreme value, so that the second adjustment value is determined. This second adjustment value is set as the adjustment value after correction. As such, the second base images and the second correction images are formed by layering based on the first interval used for forming the first base images, allowing correction with higher accuracy. Moreover, the density is detected only for the adjustment values specified based on the first adjustment value and the first interval, also allowing correction in a shorter time.

Furthermore, in the present invention, the plurality of adjustment values determined based on the first adjustment value and the first interval are defined to fall within a predetermined range. By thus performing adjustment with the plurality of adjustment values only in the defined range, not in the entire adjustable range, correction can be carried out in an even shorter time, if it only requires fine adjustment.

Still further, in the present invention, it is determined whether or not the second base images and the second correction images are formed. If a maintenance person, a user or the like enters an instruction, using the operation unit, not to form the second base images and the second correction images, or if there is a definite condition for not forming the second base images and the second correction images, such as the case where the number of image formations after delivery has reached a certain number, only the first base images and the first correction images are formed to determine the first adjustment value. Then, the determined first adjustment value is employed as an adjustment value for a correction color, to make a correction. Accordingly, color adjustment can readily be carried out in a shorter time at a simple maintenance by appropriately omitting the second stage of color adjustment, which makes the present invention highly effective.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of correcting a predetermined adjustment value for an image forming apparatus producing an image of each of separated colors in accordance with said predetermined adjustment value, comprising the steps of:
   forming a first base image from a base color output in accordance with said predetermined adjustment value, and forming a first correction image from a correction color to be a subject for correction output in accordance with a value obtained by changing said predetermined adjustment value within a predetermined range;
   determining a first adjustment value from the changed predetermined adjustment values based on a density output from a sensor detecting the density of an image forming portion;
   forming a second base image from the base color output in accordance with said predetermined adjustment value, and forming a second correction image from a correction color output in accordance with a plurality of adjustment values determined based on said first adjustment value;
   determining a second adjustment value from said plurality of adjustment values based on the density output from said sensor; and
   correcting said predetermined adjustment value for the correction color to the determined second adjustment value.

2. An image forming apparatus producing an image of each of separated colors in accordance with a predetermined adjustment value, comprising:
   a sensor detecting a density of an image forming portion; and
   a processor capable of performing the following operations comprising:
      a first forming step of forming a first base image from a base color output in accordance with said predetermined adjustment value, and forming a first correction image from a correction color to be a subject for correction output in accordance with a value obtained by changing said predetermined adjustment value within a predetermined range;
      a step of determining a first adjustment value from the changed predetermined adjustment values based on the density output from said sensor;
      a second forming step of forming a second base image from a base color output in accordance with said predetermined adjustment value, and forming a second correction image from a correction color output in accordance with a plurality of adjustment values determined based on said first adjustment value;
      a step of determining a second adjustment value from said plurality of adjustment values based on the density output from said sensor; and
      a correction step of correcting said predetermined adjustment value for the correction color to the determined second adjustment value.

3. The image forming apparatus according to claim 2, wherein said first forming step forms the first base images with a first interval and forms said first correction images based on a value obtained by changing an adjustment value within the range of the first interval.

4. The image forming apparatus according to claim 3, wherein said second forming step forms the second base images, based on said first interval, from the base color output in accordance with the predetermined adjustment value, and forms the second correction images, based on said first interval, from the correction color output in accordance with the plurality of adjustment values determined based on the first adjustment value and the first interval.

5. The image forming apparatus according to claim 4, wherein the processor is further capable of performing the step of defining the plurality of adjustment values determined based on said first adjustment value and the first interval such that the adjustment values fall within a predetermined range.

6. The image forming apparatus according to claim 4, wherein each of said second base images and said second correction images has a rectangular shape and a width corresponding to an integer multiple of said first interval.

7. The image forming apparatus according to claim 2, wherein said first forming step forms said first base images and first correction images having a same shape.

8. The image forming apparatus according to claim 2, said processor is further
   capable of performing the step of determining whether or not image formation by said second forming step is to be executed,
   wherein said correction step corrects the predetermined adjustment value for the correction color to said determined first adjustment value if it is determined that no image formation by said second forming step is to be executed.

9. The image forming apparatus according to claim 2, wherein said step of
   determining the first adjustment value determines the first adjustment value based on an adjustment value at which the density output from said sensor for the first base image formed by said first forming step and for the first correction image formed in accordance with a changed adjustment value takes either a maximum value or a minimum value.

10. The image forming apparatus according to claim 9, wherein said first forming
    step forms a plurality of first base images and a plurality of first correction images having a same rectangular shape with an interval longer than twice a short side length of each of the first base images and the first correction images.

11. The image forming apparatus according to claim 2, wherein said step of
    determining said second adjustment value determines the second adjustment value based on an adjustment value at which the density output from said sensor for the second base image formed by said second forming step and for the second correction image formed in accordance with the plurality of adjustment values takes either a maximum value or a minimum value.

12. An image forming apparatus producing an image of each of separated colors in accordance with a predetermined adjustment value, comprising:
a sensor detecting a density of an image forming portion;
first forming means for forming a first base image from a base color output in accordance with said predetermined adjustment value, and forming a first correction image from a correction color to be a subject for correction output in accordance with a value obtained by changing said predetermined adjustment value within a predetermined range;
means for determining a first adjustment value from the changed predetermined adjustment values based on the density output from said sensor;
second forming means for forming a second base image from a base color output in accordance with said predetermined adjustment value, and forming a second correction image from a correction color output in accordance with a plurality of adjustment values determined based on said first adjustment value;
means for determining a second adjustment value from said plurality of adjustment values based on the density output from said sensor; and
correction means for correcting said predetermined adjustment value for the correction color to the determined second adjustment value.

13. The image forming apparatus according to claim 12, wherein said first forming means forms the first base images with a first interval and forms said first correction images based on a value obtained by changing an adjustment value within the range of the first interval.

14. The image forming apparatus according to claim 13, wherein said second forming means forms the second base images, based on said first interval, from the base color output in accordance with the predetermined adjustment value, and forms the second correction images, based on said first interval, from the correction color output in accordance with the plurality of adjustment values determined based on the first adjustment value and the first interval.

15. The image forming apparatus according to claim 14, further comprising means for defining the plurality of adjustment values determined based on said first adjustment value and the first interval such that the adjustment values fall within a predetermined range.

16. The image forming apparatus according to claim 14, wherein each of said second base images and said second correction images has a rectangular shape and a width corresponding to an integer multiple of said first interval.

17. The image forming apparatus according to claim 14, wherein said means for determining the first adjustment value determines the first adjustment value based on an adjustment value at which the density output from said sensor for the first base image formed by said first forming means and for the first correction image formed in accordance with a changed adjustment value takes either a maximum value or a minimum value.

18. The image forming apparatus according to claim 12, wherein said first forming means forms said first base images and first correction images having a same shape.

19. The image forming apparatus according to claim 12, further comprising
means for determining whether or not image formation by said second forming means is to be executed,
wherein said correction means corrects the predetermined adjustment value for the correction color to said determined first adjustment value if it is determined that no image formation by said second forming means is to be executed.

20. A recording medium recording a computer program for correcting a predetermined adjustment value for an image forming apparatus which produces an image of each of separated colors in accordance with said adjustment value, said computer program comprising the steps of:
making a computer form a first base image from a base color output in accordance with said predetermined adjustment value, and form a first correction image from a correction color to be a subject for correction output in accordance with a value obtained by changing said predetermined adjustment value within a predetermined range;
making the computer determine a first adjustment value from the changed predetermined adjustment values based on a density output from a sensor detecting the density of an image forming portion;
making the computer form a second base image from a base color output in accordance with said predetermined adjustment value, and form a second correction image from a correction color output in accordance with a plurality of adjustment values determined based on said first adjustment value;
making the computer determine a second adjustment value from said plurality of adjustment values based on the density output from said sensor; and
making the computer correct said predetermined adjustment value for the correction color to the determined second adjustment value.

* * * * *